US010288864B2

(12) United States Patent
Prendergast et al.

(10) Patent No.: US 10,288,864 B2
(45) Date of Patent: May 14, 2019

(54) NIGHT VISION GOGGLE ADAPTER

(71) Applicant: Norotos, Inc., Santa Ana, CA (US)

(72) Inventors: Jonathon R. Prendergast, Newport Beach, CA (US); Ronald R. Soto, Santa Ana, CA (US)

(73) Assignee: Norotos, Inc., Santa Ana, CA (US)

( * ) Notice: Subject to any disclaimer, the term of this patent is extended or adjusted under 35 U.S.C. 154(b) by 134 days.

(21) Appl. No.: 15/640,422

(22) Filed: Jun. 30, 2017

(65) Prior Publication Data

US 2018/0314052 A1 Nov. 1, 2018

Related U.S. Application Data

(60) Provisional application No. 62/492,090, filed on Apr. 28, 2017, provisional application No. 62/502,501, filed on May 5, 2017.

(51) Int. Cl.
*A42B 3/04* (2006.01)
*G02B 23/16* (2006.01)
*F41H 1/04* (2006.01)

(52) U.S. Cl.
CPC .............. *G02B 23/16* (2013.01); *A42B 3/042* (2013.01); *A42B 3/0406* (2013.01); *F41H 1/04* (2013.01)

(58) Field of Classification Search
CPC .................... F16C 11/048; F16C 11/10; A45F 2200/0541; A42B 3/04; Y10T 29/49826
USPC ........... 2/422, 6.6; 224/181; 248/689, 220.2, 248/222.13, 223.41, 902
See application file for complete search history.

(56) References Cited

U.S. PATENT DOCUMENTS

| 4,670,912 | A | * | 6/1987 | Hart | A42B 3/04 2/422 |
| 4,809,942 | A | * | 3/1989 | Kastendieck | A42B 3/042 248/222.13 |
| 5,064,278 | A | * | 11/1991 | Thomanek | F16M 13/04 359/400 |
| 5,467,479 | A | * | 11/1995 | Mattes | A42B 3/04 2/422 |
| 5,469,578 | A | * | 11/1995 | Mattes | G02B 23/125 2/6.7 |
| 6,862,748 | B2 | | 3/2005 | Prendergast | |
| 7,418,738 | B2 | * | 9/2008 | Prendergast | A42B 3/04 2/22 |
| 7,504,918 | B2 | | 3/2009 | Prendergast et al. | |

(Continued)

OTHER PUBLICATIONS

International Search Report and Written Opinion for International Application No. PCT/US2017/045991, dated Oct. 19, 2017, 5 pages.

*Primary Examiner* — Terrell L McKinnon
*Assistant Examiner* — Michael McDuffie
(74) *Attorney, Agent, or Firm* — Lewis Roca Rothgerber Christie LLP

(57) ABSTRACT

A night vision goggle adapter, the adapter includes a knob, a yoke, the yoke includes an attachment portion operably connected to a helmet mount, a spring operably placed between the knob and yoke, a shaft, the shaft includes a first end operably connected with the knob, and a second end, a head, the head receives a portion of the shaft and is attached to a night vision goggle, and a cam pivotally mounted to the second end of the shaft for movement between a release and clamped position to respectively disengage and engage the adapter to the head.

16 Claims, 28 Drawing Sheets

(56) References Cited

U.S. PATENT DOCUMENTS

| | | | |
|---|---|---|---|
| 7,649,701 B2 | 1/2010 | Prendergast et al. | |
| 8,209,780 B1 * | 7/2012 | Lemire | A42B 3/04 |
| | | | 2/422 |
| 8,238,045 B2 | 8/2012 | Prendergast et al. | |
| 8,375,473 B2 * | 2/2013 | Celona | G02B 23/125 |
| | | | 2/422 |
| 9,781,963 B1 * | 10/2017 | Celona | A42B 3/042 |
| 2002/0120979 A1 * | 9/2002 | Prendergast | A42B 3/04 |
| | | | 2/422 |
| 2004/0181855 A1 * | 9/2004 | Prendergast | A42B 3/04 |
| | | | 2/422 |
| 2006/0278035 A1 * | 12/2006 | Casas | F41G 1/44 |
| | | | 74/553 |
| 2008/0170838 A1 * | 7/2008 | Teetzel | A42B 3/042 |
| | | | 386/358 |
| 2008/0263752 A1 | 10/2008 | Solinsky et al. | |
| 2009/0135506 A1 * | 5/2009 | Willey | A42B 3/042 |
| | | | 359/815 |
| 2010/0150543 A1 * | 6/2010 | Fong | F16M 13/00 |
| | | | 396/428 |
| 2011/0145981 A1 * | 6/2011 | Teetzel | A42B 3/04 |
| | | | 2/422 |
| 2011/0239354 A1 * | 10/2011 | Celona | A42B 3/04 |
| | | | 2/422 |
| 2013/0083391 A1 * | 4/2013 | Teetzel | G02B 23/16 |
| | | | 359/409 |
| 2015/0253563 A1 * | 9/2015 | DiCarlo | G02B 23/125 |
| | | | 403/322.4 |
| 2016/0120296 A1 * | 5/2016 | DiCarlo | F16C 11/10 |
| | | | 248/220.22 |

* cited by examiner

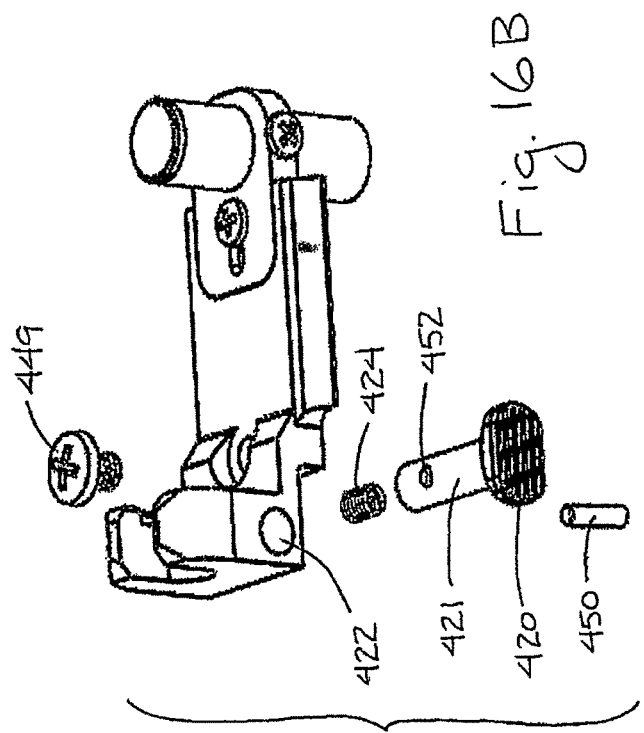

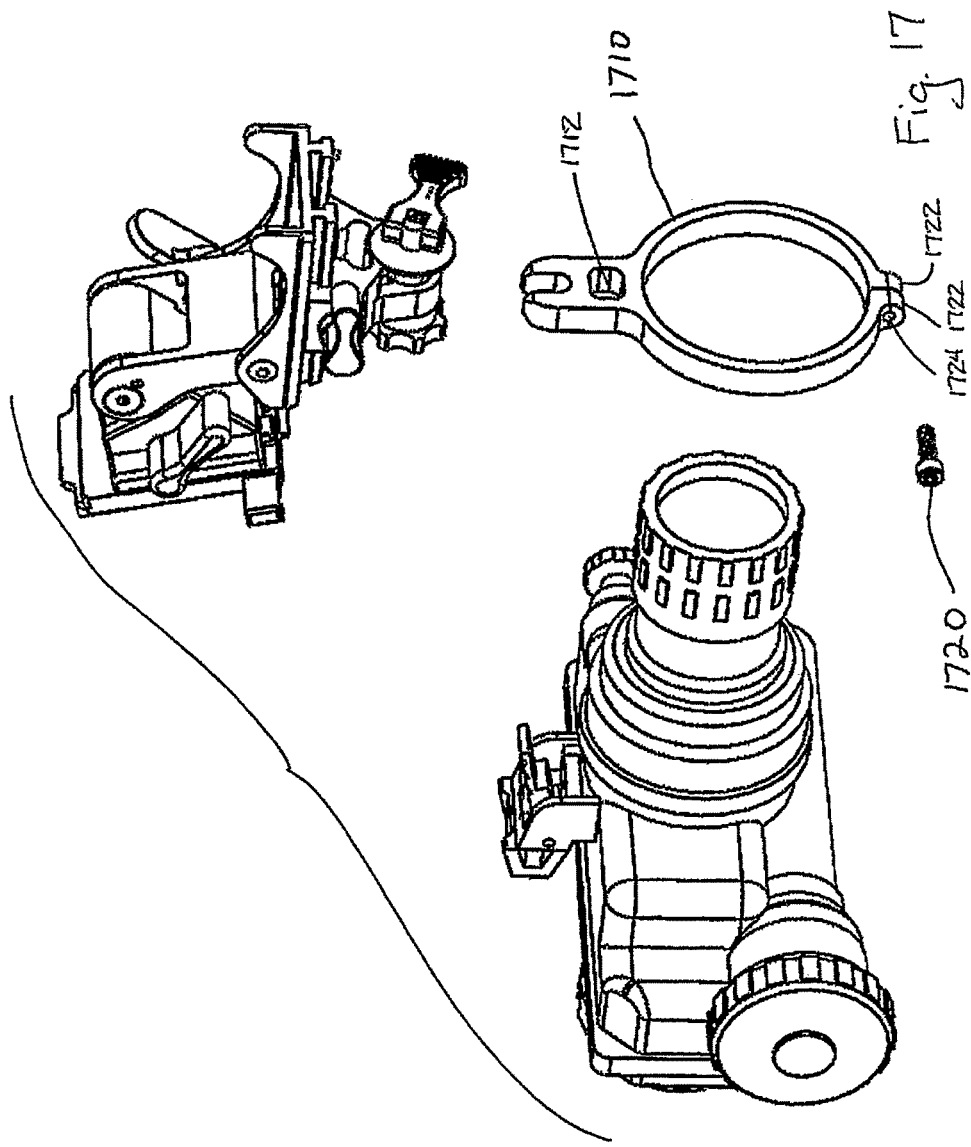

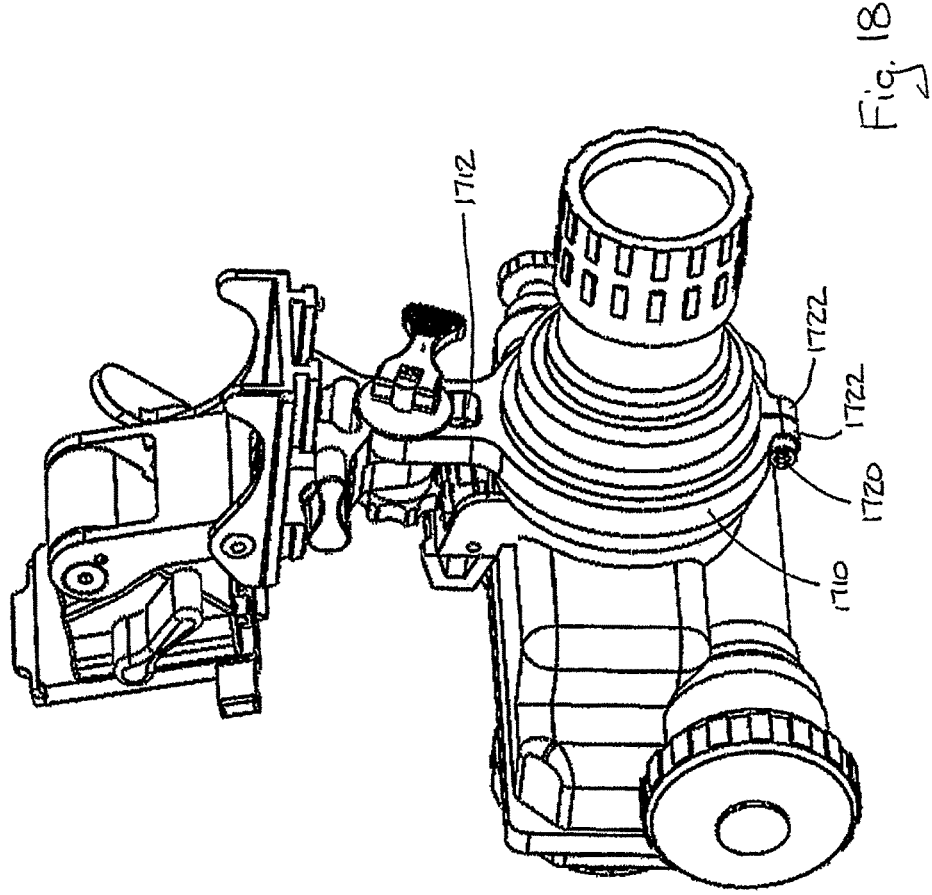

NIGHT VISION GOGGLE ADAPTER

CROSS-REFERENCE TO RELATED APPLICATIONS

This application claims the benefit of U.S. Provisional Application No. 62/492,090 filed Apr. 28, 2017, and also U.S. Provisional Application No. 62/502,501 filed May 5, 2017, the entire content of which are incorporated herein by reference.

TECHNICAL FIELD

The present invention relates generally to night vision goggle adapter devices.

BACKGROUND OF THE INVENTION

While wearing a helmet, it may be beneficial to attach night vision goggles to the helmet. However, the problem with attaching the night vision goggles to the helmet is that it has typically been an inexact fit; due to the variations in the helmet mounts and night vision goggles in use, and the facial features of people. This may result in not only frustration in trying to use the night vision goggles but it may also lead to errors or imprecise use of the goggles. Moreover, if an adapter is used to allow use of a particular helmet mount with a particular night vision goggle, the adapter may make fine adjustments in the position of the night vision goggles during use even more difficult, and may add to the height profile when a night vision goggle is placed in the stowed position back over the helmet.

To overcome the shortcomings with existing night vision goggle adapters, the present invention provides, in one or more embodiments, a night vision goggle adapter to mitigate or obviate one or more of the aforementioned problems. For example, in one or more embodiments the adapter may provide for infinite adjustability of position within the range of movement. The adapter may also allow for the ability to stow night vision goggles in a position that is closer to the helmet in both a low stow and a high stow mode. In addition, embodiments of the present invention provide a night vision goggle adapter that is lightweight, adjustable, and still able to provide a stable and secure attachment in a wide variety of situations while being capable of finely adjusting the location of the night vision goggle.

SUMMARY OF THE INVENTION

The present disclosure is directed to various embodiments of an attachment device which may include one or more of the following features.

A night vision goggle adapter, the adapter includes a knob, a yoke, the yoke includes an attachment portion configured to be operably connected to a helmet mount, a spring operably placed between the knob and yoke, a shaft, the shaft includes a first end operably connected with the knob, and a second end, a head, wherein the head receives a portion of the shaft and is configured to be attached to a night vision goggle, and a cam pivotally mounted to the second end of the shaft for movement between a released and clamped position to respectively disengage and engage the adapter to the head.

A surface of the knob may be knurled or castellated.
The attachment portion may be a rail.
The attachment portion may be a dovetail plate.
The head may include an attachment arm, the attachment arm attaches to the night vision goggle.
The attachment arm may include a knob that attaches the night vision goggle to the attachment arm.
The attachment arm may include a magnetic gravity switch.
The head may include a counter bore portion.
The shaft may include a wider diameter portion.
A cross pin may be fixed into the wider diameter portion of the shaft, the ends of the pin extend outwardly beyond the diameter of the wider diameter portion of the shaft, the ends of the pin are received into notches about an opening at a bottom of the yoke.

A method of attaching from an adapter for a night vision goggle, the adapter includes a knob, a yoke, the yoke includes an attachment portion operably connected to a helmet mount, a spring operably placed between the knob and yoke, a shaft, the shaft includes a first end operably connected with the knob, and a second end, a head, the head receives a portion of the shaft and is attached to a night vision goggle, and a cam pivotally mounted to the second end of the shaft for movement between a release and clamped position, including the step of disengaging, and engaging the adapter to the night vision goggle.

A surface of the knob may be knurled or castellated.
The attachment portion may be a rail.
The attachment portion may be a dovetail plate.
The head may include an attachment arm, the attachment arm attaches to the night vision goggle.
The attachment arm may include a knob that attaches the night vision goggle to the attachment arm.
The attachment arm may include a magnetic gravity switch.
The head may include a counter bore portion.
The shaft may include a wider diameter portion.
A cross pin may be fixed into the wider diameter portion of the shaft, the ends of the pin extend outwardly beyond the diameter of the wider diameter portion of the shaft, the ends of the pin are received into notches about an opening at a bottom of the yoke.

This summary is provided to introduce a selection of concepts that are further described below in the detailed description. This summary is neither intended to identify key or essential features of the claimed subject matter, nor is it intended to be used in limiting the scope of the claimed subject matter.

BRIEF DESCRIPTION OF THE DRAWINGS

The features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale.

FIG. 16B is a perspective view of another embodiment of a head.

FIG. 17 is a perspective view of another embodiment of a head.

FIG. 18 is a perspective view an embodiment of an adapter connecting a helmet mount to a night vision goggle.

DETAILED DESCRIPTION

Figure 1:
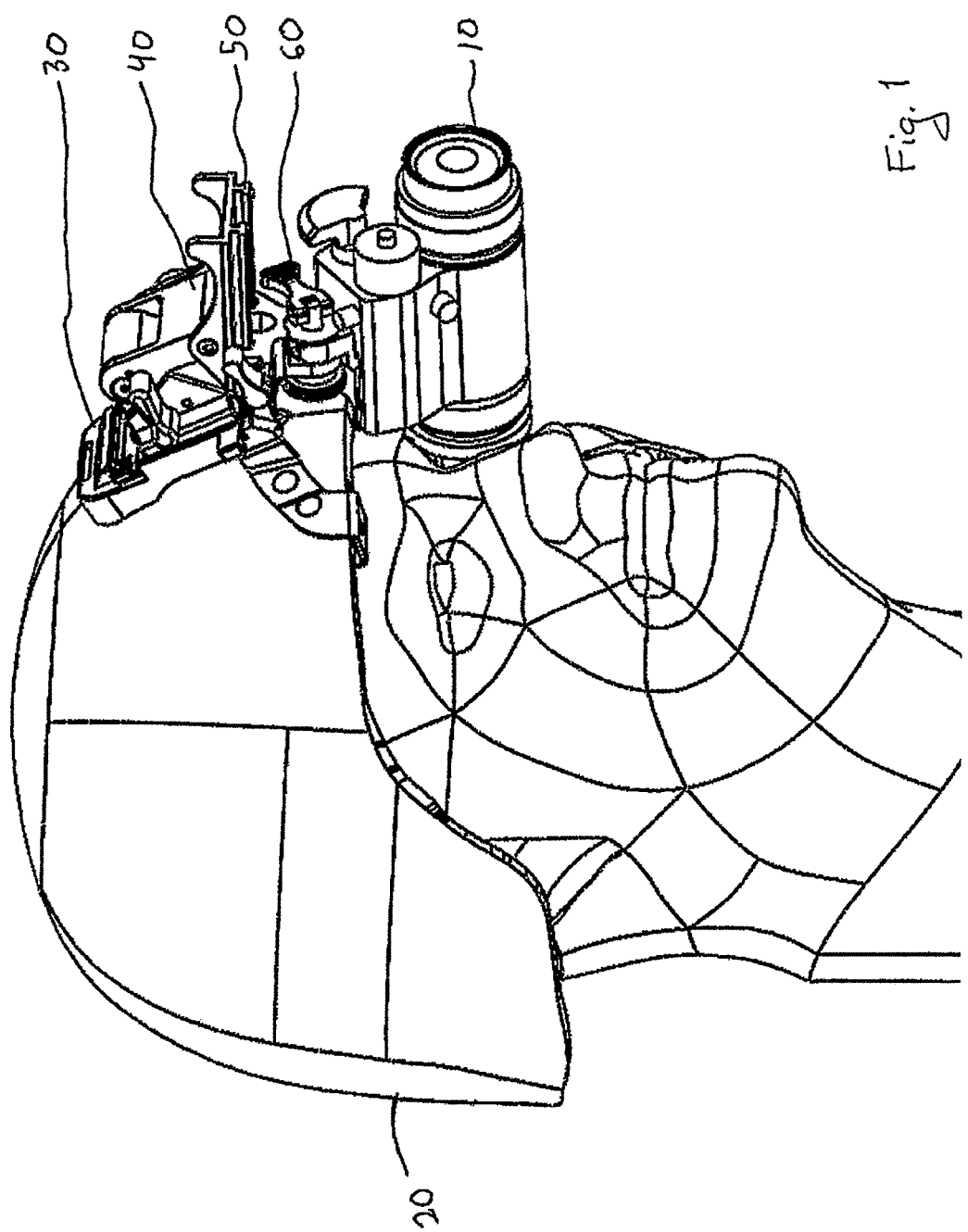
FIG. 1 is a perspective view illustrating an embodiment of the night vision goggle adapter with the night vision goggle, helmet mount, and a helmet.

Features of the inventive concept and methods of accomplishing the same may be understood more readily by reference to the following detailed description of embodiments and the accompanying drawings. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

Embodiments of the present invention provide for a secure attachment of the night vision goggles (nvg) to the helmet through the use of a night vision goggle adapter. In addition, embodiments of the present invention allow for the position and orientation of the nvg to be customized for a particular user.

Furthermore, embodiments of the present invention allow for secure attachment of the nvg adapter by using a cam system to lock the nvg in a general position, however, through the use of a knob, the user can finely adjust the amount of force or pressure needed to position the nvg. Moreover, the position of the nvg may be infinitely adjustable within the range of travel provided by the adapter.

Now referring to FIG. 1, a perspective view illustrating an embodiment of the helmet attachment device is shown. In order to operably attach night vision goggles 10 to a helmet 20, there may be three intermediate elements between the nvg and the helmet or headgear. The three elements may be a shroud plate 30 that connects the helmet to a helmet mount 40, a helmet mount, and in some cases an adapter that connects the nvg to the helmet mount. See FIG. 1. The helmet mount may connect directly to a carriage on the night vision goggles by the use of rails 50. The user may slide the nvg adapter on the rail or rails and thereby operably connect to the helmet.

Alternatively, as shown in FIG. 1, an adapter may be used to provide the operable connection between the nvg and the rails on the helmet mount. The adapter 60 may be used to adjust the position of the nvg. By using the adapter, the user may adjust the location of the nvg to their personal eye position. Due to the variations in helmet size and type, in the position helmets are worn, and in the facial features of people, this adapter may provide a mechanism to adjust the nvg to a precise location depending on user preference. The adapter may be used to precisely adjust the position of the nvg to account for a particular eye. Furthermore, the adapter may be used to swing the nvg to the other eye. As another option, the adapter may be used to swing the nvg out of the way altogether and clear the path of vision for the user. The adapter may also allow for different versions of nvg to be used with the same helmet mount.

Figure 2:
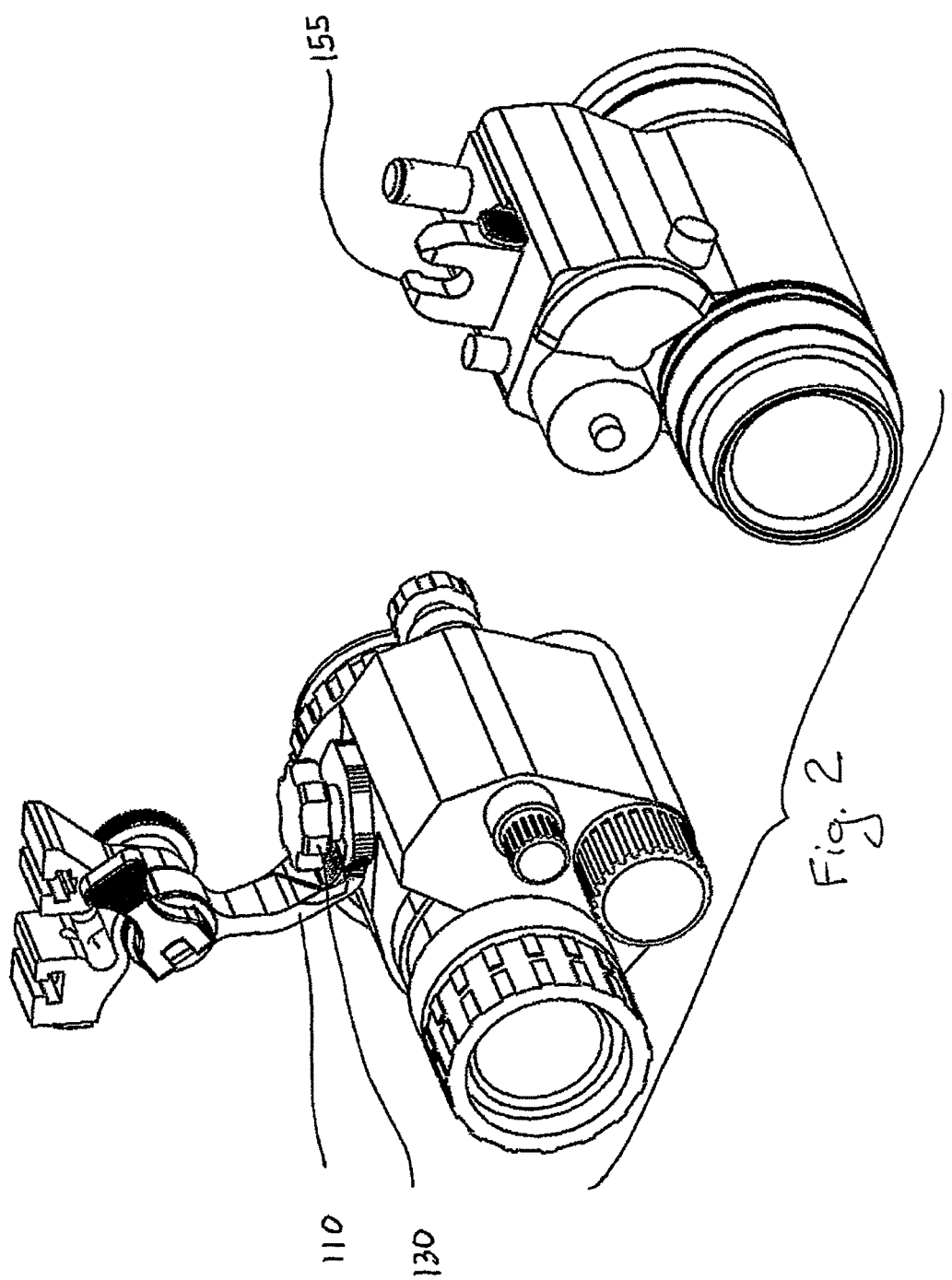
FIG. 2 is a perspective view of two embodiments of night vision goggles with attachment mechanisms, one with an arm attached to the night vision goggle and an adapter attached to the opposite end of the arm.

Head (See, e.g., FIGS. 2 and 17)

There are various means of attachment from an nvg. One end of an arm 110 may be bolted to the nvg. The bolt 120 may include a knob 130 that may be hand tightened. In another embodiment, the bolt may be tightened by a standard tool readily available to users, or by a specialized tool. The arm curves outwardly from the nvg and on the other end is a head 150 wherein the adapter may attach. As a non-limiting example, the head may be crescent shaped with an opening. In other embodiments, the head may be a fully closed circular head. Alternatively, the nvg may have just the crescent shaped head 155 protruding from the nvg. FIG. 2 shows these two alternatives. In yet another embodiment, the head may be attached to a clamp ring 1710. FIG. 17 shows this alternative.

Regardless of the type of attachment from the nvg, the crescent shaped head may be attached to the nvg and ultimately through the adapter, helmet mount and plate to the helmet. Furthermore, the type and shape of the attachment piece may be shaped differently than a crescent shape. The crescent shape is used as an illustrative example and should not be used to limit the scope of the attachment means.

Figure 3:
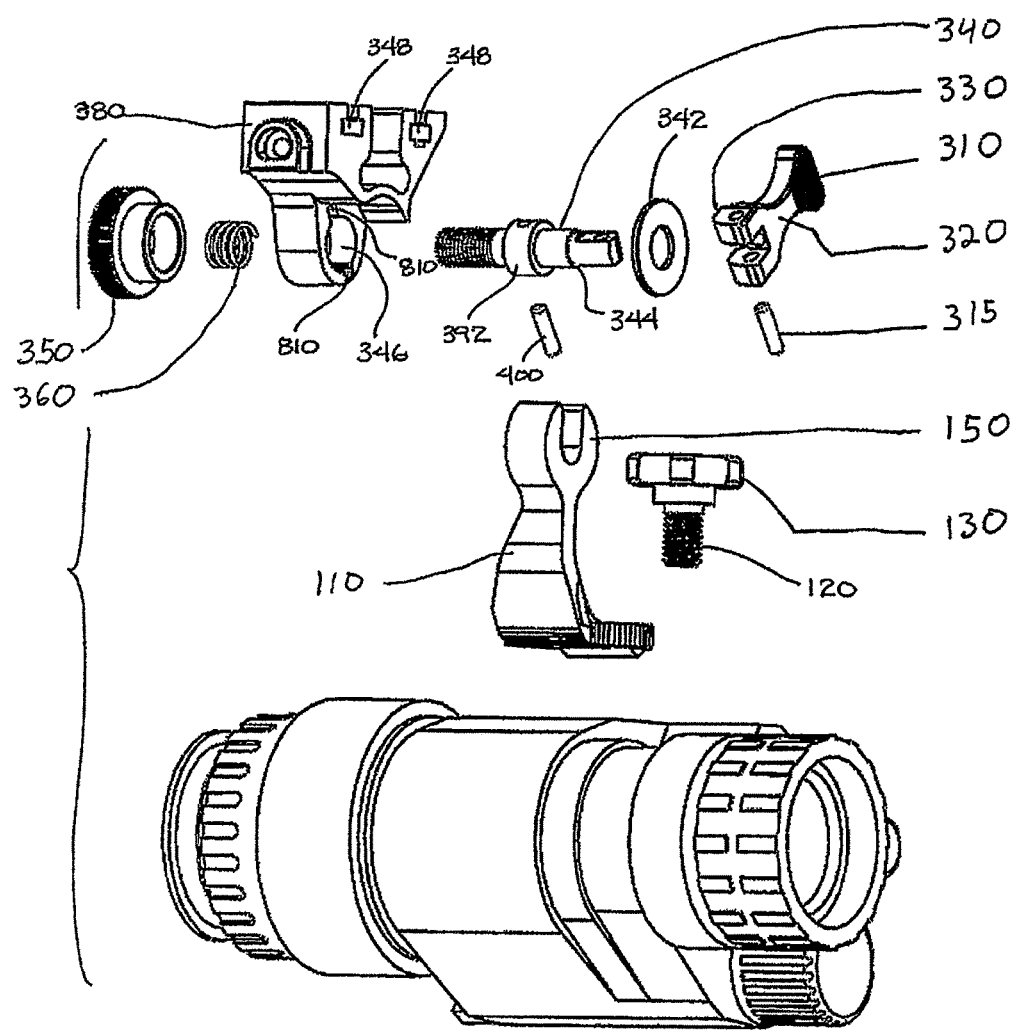
FIG. 3 is an exploded view of an adapter above a night vision goggle.
Figure 6:
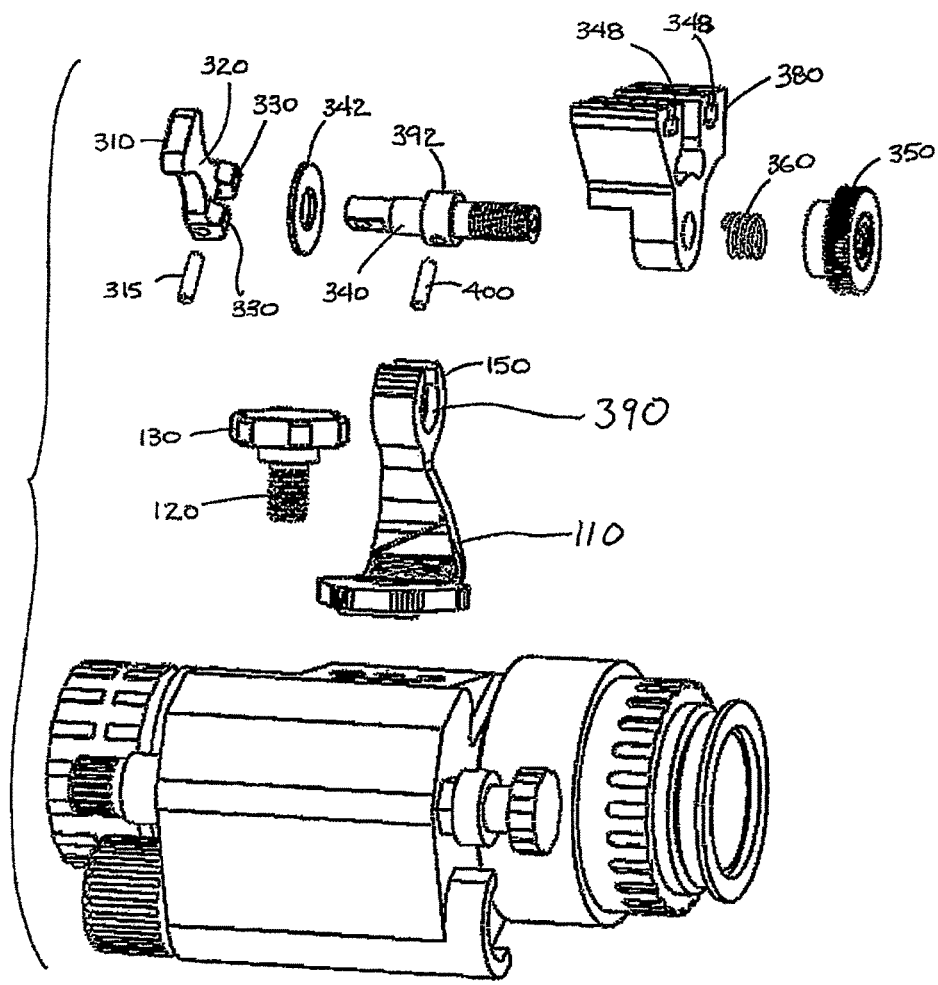
FIG. 6 is an exploded view of an adapter above a night vision goggle.

With reference to FIGS. 3 and 6, the components of an adapter are shown from two different perspectives. At one end, a cam lock 310 is rotatably attached by a pin 315 to one end of a shaft or bolt 340. A cam surface of the cam lock acts against a washer or spring washer 342 slid over the end of the shaft to which the cam lock is rotatably attached. A shoulder 344 on the shaft holds the washer in place. The shaft is then received through a lower opening 346 in a yoke 380. The upper side of the yoke has slide openings 348 that will mate with the T rails on a helmet mount. A coil spring or other biasing means 360 is then received on the shaft at the lower opening in yoke 380. A knurled knob or nut 350 then threads on the end of the shaft opposite the cam lock.

FIGS. 3 and 6 also show attachment arm 110 positioned below the adapter, with the crescent shaped head directed upwardly toward the adapter for attachment around the shaft. Although the attachment arm is shown in these figures, it should be understood that the alternative crescent shaped head 155 (see FIG. 2) that protrudes directly from an nvg may be similarly positioned.

Furthermore, inside the attachment portion of the crescent shaped head at one side may be a counter bore 390. See FIG. 6. The counter bore may be an enlarged opening that forms a flat-bottomed flange at its mouth. The counter bore of the crescent shaped head may fit over a wider diameter section 392 of the shaft when that section is slid in from the side. However, the opening in the crescent shaped head is too narrow for the wider diameter section of the shaft to slide out of that opening when the wider diameter section is in the counter bore. As the user activates the cam lock by rotating the external arm, the cam surface would pull the shaft toward the axis of the cam lock. The pulling action would pull the entire shaft, along with the adapter and everything else on the shaft closer to each other because on the other end of the shaft is the screwed-in knurled nut acting as an anchor. Thus, the wider diameter section of the shaft would be pulled into the counter bore thereby locking the nvg on the adapter. This would also potentially create a mechanical lock that would hold the position of the nvg.

The Cam (See, e.g., FIGS. 3 and 6)

The cam lock 310 may be used to lock the adapter into place. However, as will be discussed later, although the position of the adapter in relation to the nvg may be locked, it would still have the capacity to finely adjust the force or pressure needed to manually or physically move the adapter location by the use of the knurled nut. The cam lock may be located at the end of a shaft.

A clamp with a cam 320 and an external arm may be pivotally mounted to an end of a shaft 340 for movement between a released and clamped position to respectively disengage and engage the adapter to the crescent shaped head. The clamp may have an integral cam and may have an elongated handle extending outwardly that may make the movement between the released and clamped position easier to achieve. The cam may have one or more inwardly facing rounded portions 330 that provide the cam surface that will contact a washer 342.

Although it may not be needed if the knurled nut described below is used, the cam may be made to have different distances from the pivot point to the cam surface. Varying this distance allows a given cam to work to secure the adapter with varying degrees of engagement or force. Also, when the cam is unlocked or disengaged, the adapter and the nvg may be separated altogether.

The Shaft (See, e.g., FIGS. 3 and 6)

A shaft 340 may be inserted into the adapter to connect the adapter to the crescent shaped head and the knurled nut. The shaft may have different diameter portions in order to create different strengths of attachment. In other embodiments, the shaft may be uniform in diameter.

Furthermore, the shaft may have a partition or other barriers to create a tighter fit. Each individual piece may be precisely manufactured so that there are a series of customized fits for each individual piece that may attach to the shaft. In addition, the shaft may be a draw bolt. Also, the shaft may be hollow or solid, depending on the need of the user. A hollow shaft may be lighter and may be able to house electric components or other features. For example, there may be a bar magnet embedded inside a shaft in order to actuate a reed switch. As a non-limiting example, the shaft may have a textured surface in order to create a customized friction fit. Moreover, there may be grooves on the surface at incremental intervals in order to enhance the finely adjusted position of the adapter. Also, the opposite end of where the cam lock is located may have threads in order to insert into the knurled nut. In other embodiments, the threaded knurled nut may be inserted into the threaded shaft. However, for the purposes of illustration, this feature will be described where the threaded shaft is twisted into the threaded knurled nut. By twisting the threaded portion of the knurled nut into the threaded portion of the shaft a user would thereby tighten the adapter to create a frictional fit and secure the position of the nvg. Also, the shaft may have different sections such as a wider diameter section that may interact with the counter bore located inside the crescent shaped head. The shaft may have additional sections that may vary in diameter in order to create different degrees of tightening. Also, the shaft may have a shoulder to hold a washer or other items in place.

The Nut (See, e.g., FIGS. 3 and 6)

As a non-limiting example, the nut may be knurled on the exterior surface. The knurled nut 350 may be used to adjust the position of the shaft in the adapter and thereby control the tightness with which the crescent shaped head is held on the shaft against the side of the wider diameter section. Tightening down the nut can create sufficient friction once the cam lock is engaged to prevent the arm and therefore the nvg from being rotated about the shaft at the crescent head.

Alternatively, the knurled nut may be adjusted while the cam lock is disengaged to set the amount of force or pressure required for manual repositioning of the nvg by rotation about the shaft. After an adjustment, the cam lock can be engaged and a user can test the force needed. In this manner, the amount of force needed to change the position of the nvg during use can be set to a user's preference. The nut may also be tightened once the desired position is reached to lock the nvg in position.

Further alternatively, the knurled nut may be tightened to allow for adjustment of the nvg position by deliberate movement of the nvg against the friction fit, but not allow for movement during typical use. However, in such a mode, should an inadvertent force strike the nvg, the nvg will be able to move so as to minimize damage to the nvg and the user. The knurled nut may be spring-loaded 360 in order to bias the larger diameter section of the shaft to move out of the counter bore region of the crescent head when the cam lock is disengaged, to thereby allow the release of the nvg from the adapter.

The nut may be manufactured to have knurls or castellations on the outside of the nut thereby circumventing the need for tools to adjust the position of the adapter.

The Yoke (See, e.g., FIGS. 3 and 6)

The yoke 380 may receive the shaft on one end; and have the spring-loaded knurled nut at the other end. The yoke may have a slide piece located at the top of the adapter. The slide piece may be dual rail openings that the user may slide on the helmet mount on in order to attach the nvg. The position of the slide piece in relation to the nvg would determine the position of nvg as to distance from a user's eyes. The yoke/slide piece may be one piece. In other embodiments, the yoke may be made of several pieces that may have other features or design components.

Moreover, the yoke may have a lower and upper side.

The shaft may be received through a lower opening in the yoke. The upper side of the yoke may have slide openings that will mate with the T rails on a helmet mount. In another embodiment, the upper side of the yoke may have a dove tail plate (see FIG. 11) to allow for interaction with the appropriate mating connection component on a given helmet mount. Any suitable means for attaching to the yoke may be used.

Operation

Depending on the type of crescent shaped head, there may be an attachment arm that attaches to the nvg. There may be a bolt with a knob at the end so that the attachment arm may be manually bolted to the nvg. In other embodiments, the bolt may be attached to the nvg by using a special tool.

In another embodiment, just the crescent shape head, without the attachment arm, may be permanently affixed to the nvg. The shaft may be placed inside the opening of the crescent shaped head.

On one end of the shaft may be a cam clamp 320. The cam clamp may be tightened by moving the attachment arm 310 and thereby moving the distance of the axis further from the cam surface and thereby creating a mechanical lock. The cam clamp may be disengaged by releasing the attachment arm and thereby decreasing tension. The user may position the adapter and thereby the nvg by placing the adapter on the crescent shaped head in a disengaged state. Then the user would lock the nvg at the desired position by engaging the cam clamp.

Furthermore, inside the attachment portion of the crescent shaped head may be a counter bore 390. The counter bore may be an enlarged opening that has a flat bottomed flange at its mouth. Here, the counter bore of the crescent shaped head may fit over the wider diameter section of the shaft opposite the washer next to the cam lock. As the user activates the cam lock by rotating the external arm, the rounded portion would pull the shaft toward the axis of the cam lock. The pulling action would pull the entire shaft along with the adapter and everything else on the shaft closer to each other because on the other end is the screwed in knurled nut acting as an anchor. This would slide the wider diameter section of the shaft into the counter bore region of the crescent head and lock the arm and thereby the nvg to the adapter. This would also create a mechanical lock that would hold the position of the nvg.

Although the cam clamp may hold the position of the nvg, the adapter may yet be further adjusted by moving the nvg to the precise desired position and then by tightening the knurled nut. This may create a precise fit for the user's unique eye position.

Figure 4:
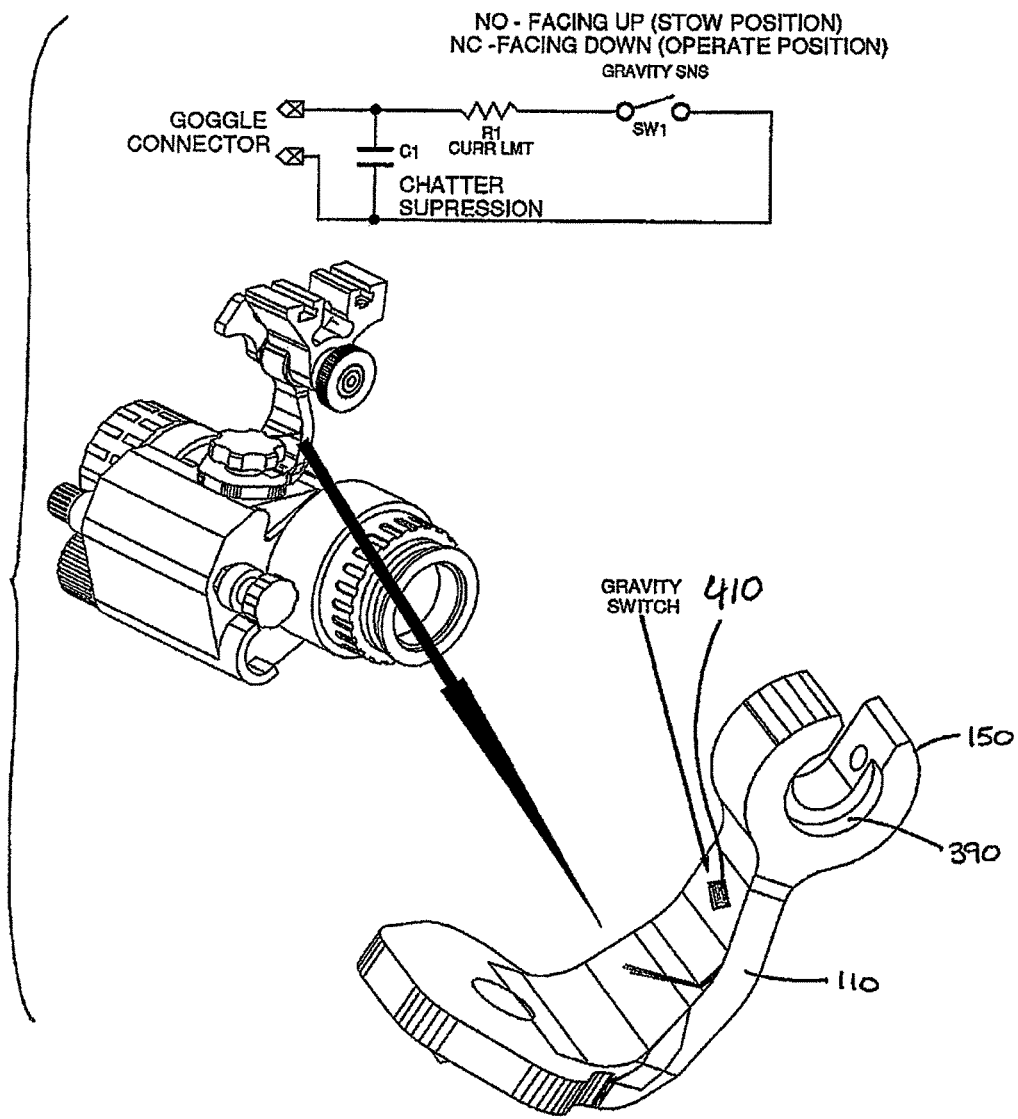
FIG. 4 is perspective views of another embodiment of the arm with a gravity switch.

Gravity Switch (see FIG. 4)

Now referring to FIG. 4, the attachment arm may have a gravity switch 410 embedded into the structure. The nvg may be turned on when the gravity switch is actuated. Depending on the position of the gravity switch, the nvg may be turned on. When the arm is positioned in the stowed position or disengaged state, the nvg would turn off. It would automatically turn back on when the nvg was returned to the use position. This feature would come in handy when the user would want to turn on the nvg without having to fumble around with an on/off switch in the dark.

In addition, in situations where detection would be unwelcomed this feature would be desirable. The green glow that comes from an nvg that is on and in the stowed position would be even more noticeable in the dark and would alert enemy combatants to the location of the user. Thus, it is desirable to have the nvg automatically turn off when placed in the stowed position.

Figure 5:
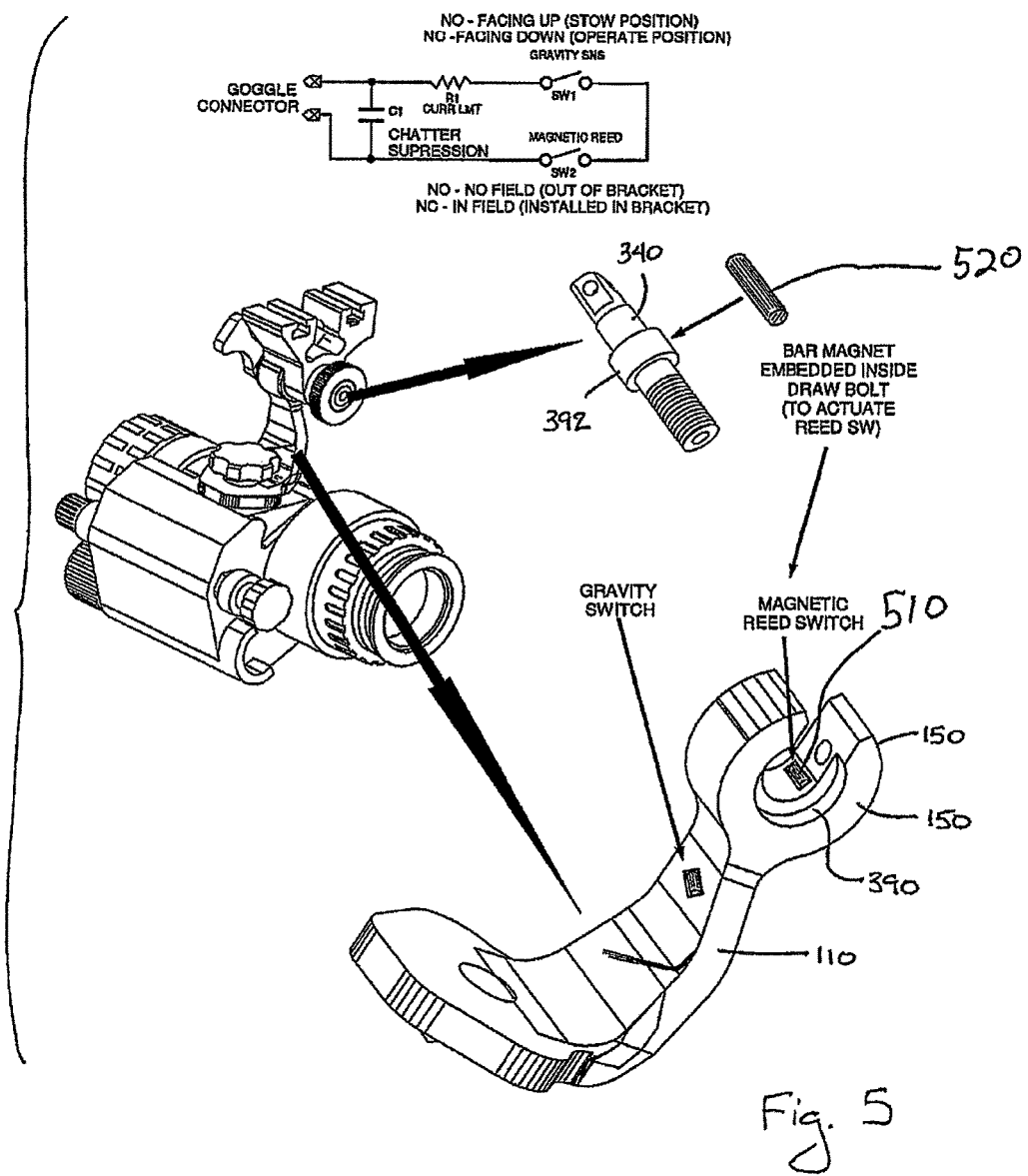
FIG. 5 is a perspective views of an embodiment of the adapter with a gravity switch and a magnetic reed switch and of a shaft with a bar magnet.

Magnetic Reed Switch (See FIG. 5)

Now referring to FIG. 5, an additional feature may utilize the use of a magnetic reed switch 510. A magnetic reed switch may be embedded in the crescent shaped head and may interact with a bar magnet 520 embedded in the shaft. As such, as long as the on button on the nvg is on, it would close the circuit and nvg would stay on. Once the user pulls out the adapter from the crescent shaped head, the nvg would automatically shut off.

Alternative Embodiments

Figure 7:
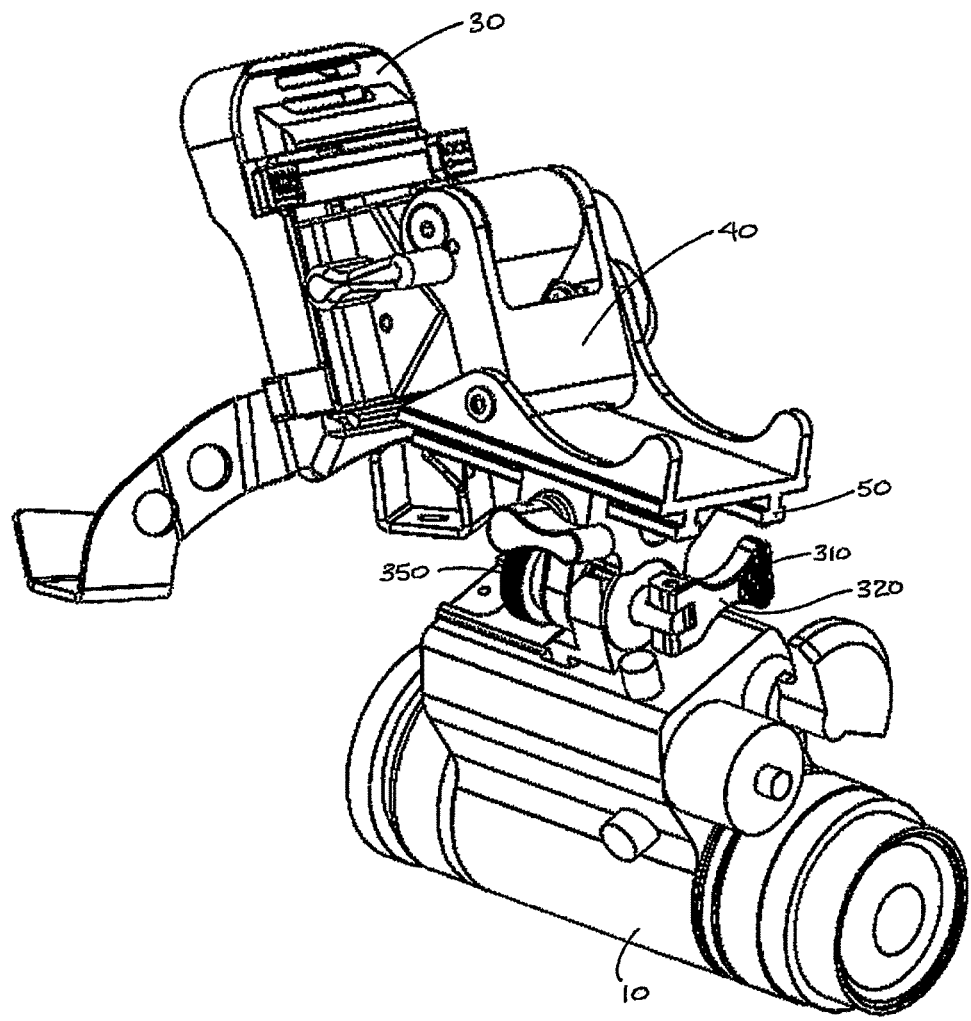
FIG. 7 is a perspective view an embodiment of the adapter connecting a helmet mount to a night vision goggle.

FIG. 7 depicts the fully assembled adapter attached to a nvg and helmet mount and shroud.

Figure 8:
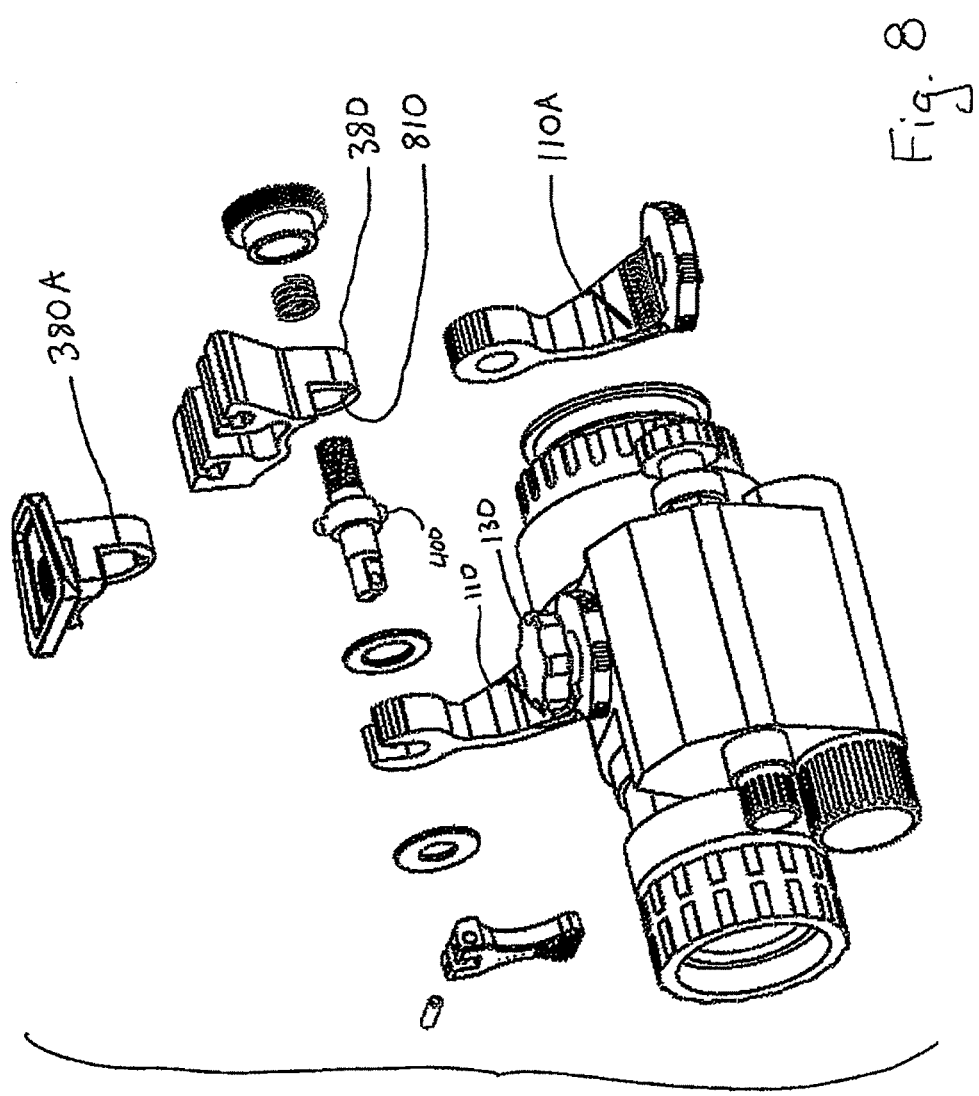
FIG. 8 is an exploded view of an adapter with different embodiments of the head and attachment portion.

FIG. 8 is an exploded view of an adapter above an nvg that illustrates some potential alternative embodiments for the adapter and related components.

As described above, arm 110 may have a crescent shaped head. The open crescent shape allows the nvg to be separated from the adapter by releasing the cam lock. However, in some embodiments, there may not be a need for such a release. In such instances, an arm 110A may have a closed circular head with a circular opening through it that can be received upon the shaft and allow the arm to rotate about the shaft. In this alternative embodiment, separation of the adapter from the nvg may be achieved by loosening the knob 130.

As described above, yoke 380 has rail openings located at its top portion for sliding attachment with mating rails on a helmet mount. However, in other embodiments, the yoke may contain alternative mechanisms for attachment to a helmet mount. For example, yoke 380A shown in FIG. 8 has a dovetail plate at its top portion for attachment to a mating opening in a helmet mount. It should be understood that other known attachment mechanisms could also be incorporated into the yoke in other embodiments. For example, a goggle horn or a hot shoe plate could be incorporated into the yoke in place of the dovetail plate to allow for interaction with the appropriate mating connection component on a given helmet mount.

FIG. 8 also illustrates a cross pin 400 frictionally fixed into the wider diameter portion of the shaft. The ends of the pin extend outwardly beyond the diameter of the wider diameter portion of the shaft. When the shaft is assembled relative to the yoke 380, the ends of the pin are received into notches 810 about the circular opening in the bottom of the yoke. The notches may be manufactured to accommodate the dimensions of the ends of the pin to ensure a tight fit. This prevents the shaft from rotating relative to the yoke. It ensures that when the arm is rotated relative to the shaft, the shaft will remain fixed in position rotationally. The cross pin may be composed of different materials depending on what is appropriate in terms of strength and weight.

Other means may be used to prevent the shaft from rotating relative to the yoke, either in addition to or instead of the cross pin.

As a non-limiting example, a flanged sleeve bearing may fit between the yoke and the edge of the wider diameter shaft section opposite that interacting with the counter bore. It may be made by a variety of different materials depending on the type of characteristics the user wishes for the adapter to have. For example, a certain type of material may have less friction and may allow the nvg to rotate more easily than a different type of material which may provide more friction when rotating the nvg.

The flanged sleeve bearing may fit inside the yoke, more specifically, inside the lower opening 346 (see FIG. 3). The outer lips of the flanged sleeve bearing may sit flush with the lower portion of the yoke.

Figure 9:
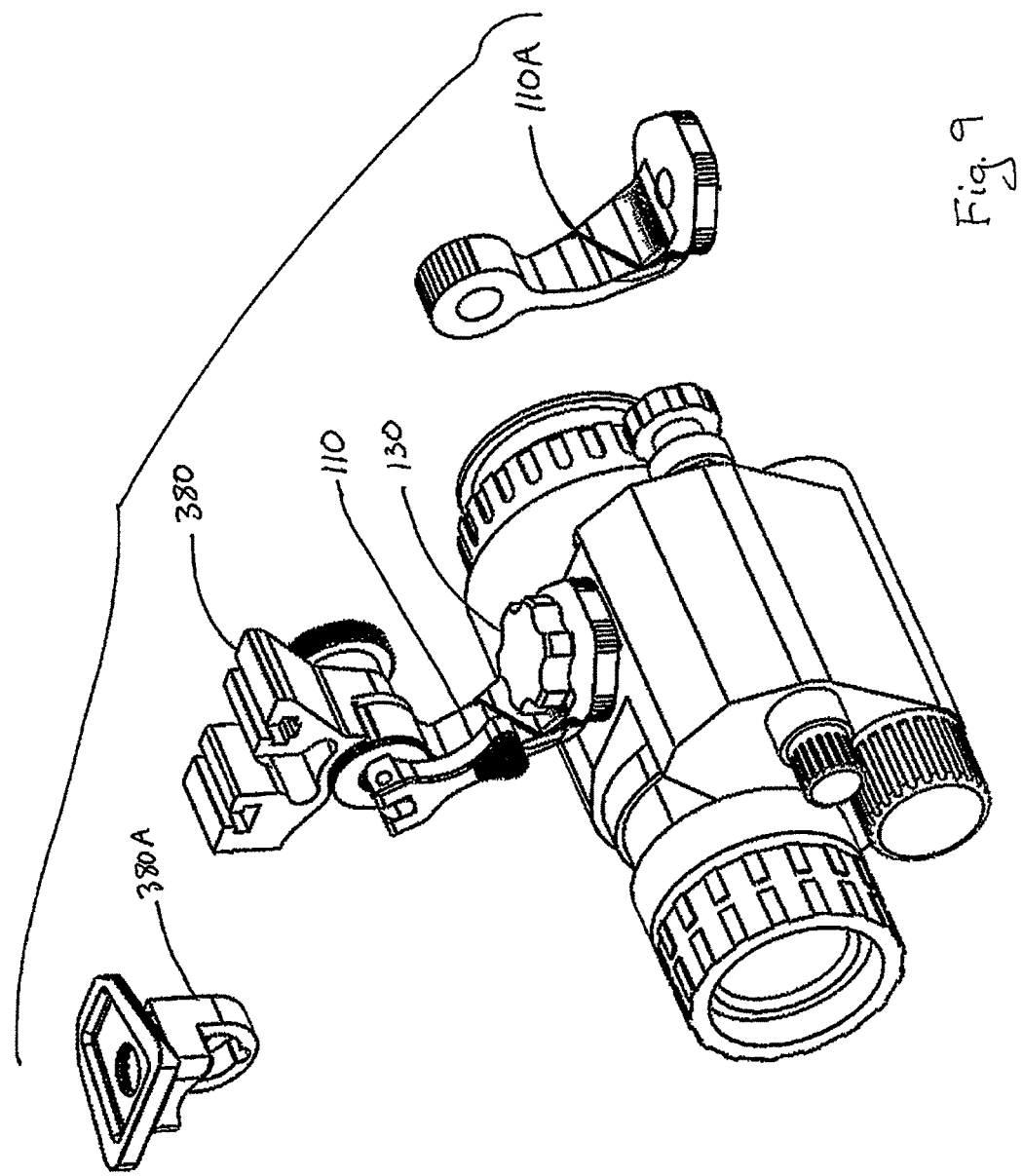
FIG. 9 is a perspective view of an adapter with different embodiments of the head and attachment portion.

FIG. 9 shows an assembled view of the adapter with the alternative arm and yoke configurations spaced to each side for comparison.

Figure 10:
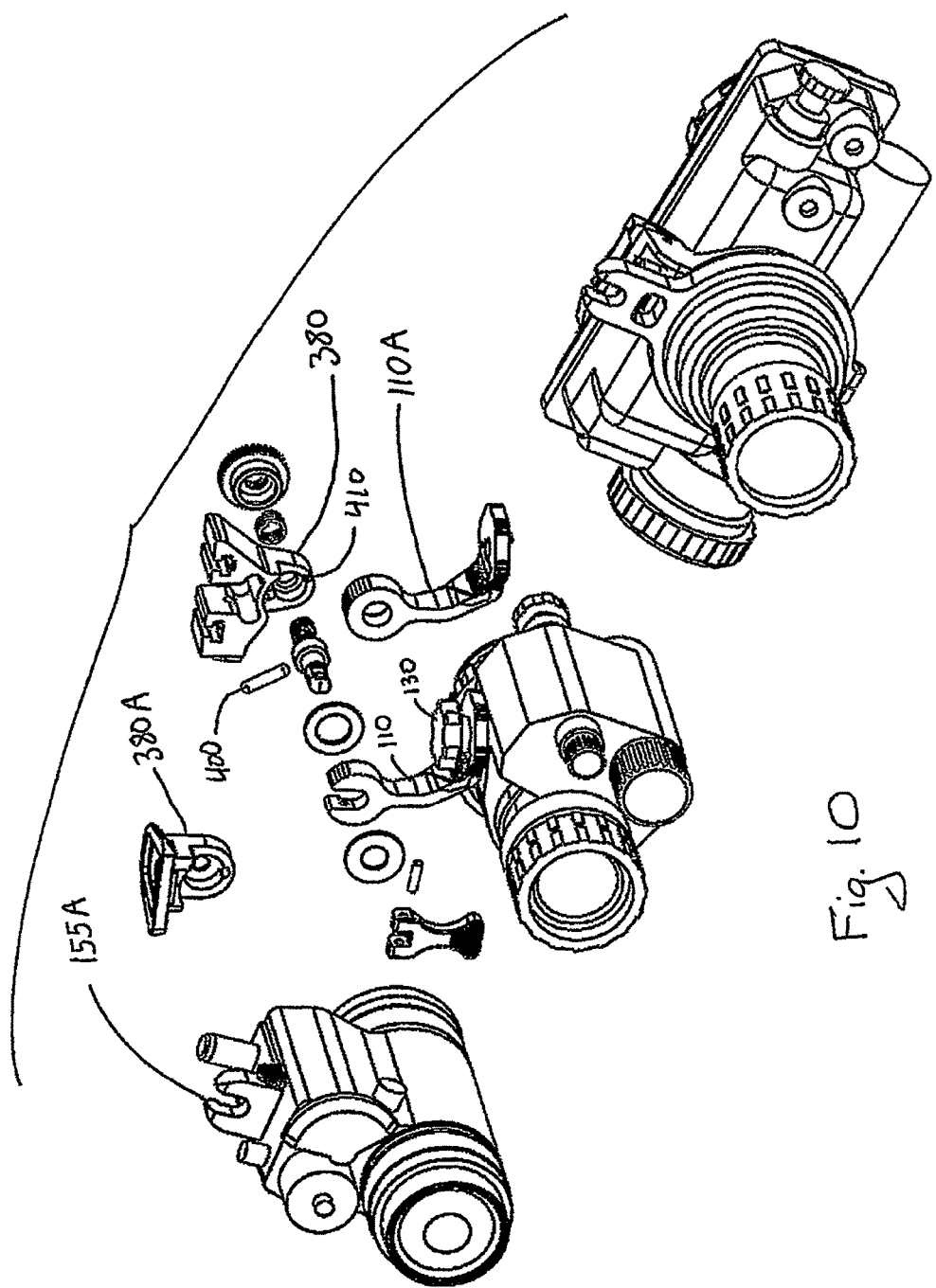
FIG. 10 is an exploded perspective view of an adapter with different embodiments of the head and attachment portion associated with different night vision goggles.

FIG. 10 shows an exploded view of the adapter, with the alternative attachment arm and yoke configurations also shown to each side for comparison. As discussed previously, the crescent shaped head may have an opening at the top or side; thereby the head would not be fully enclosed. The fully enclosed head 110A may be used where the shaft is slid through the opening. Moreover, the fully enclosed head may have a counter bore. In addition, an alternative crescent head attachment component 155A is shown attached to an alternative version of an nvg. The crescent head 155A is releasably attached to the nvg. In this embodiment, the crescent head may be slid on to the nvg and locked into place by the use of a spring-loaded release button. In another embodiment, the dovetail yoke 380A may be used for the adapter. In yet another embodiment, the head may have a clamp ring, which will be discussed below.

Figure 11:
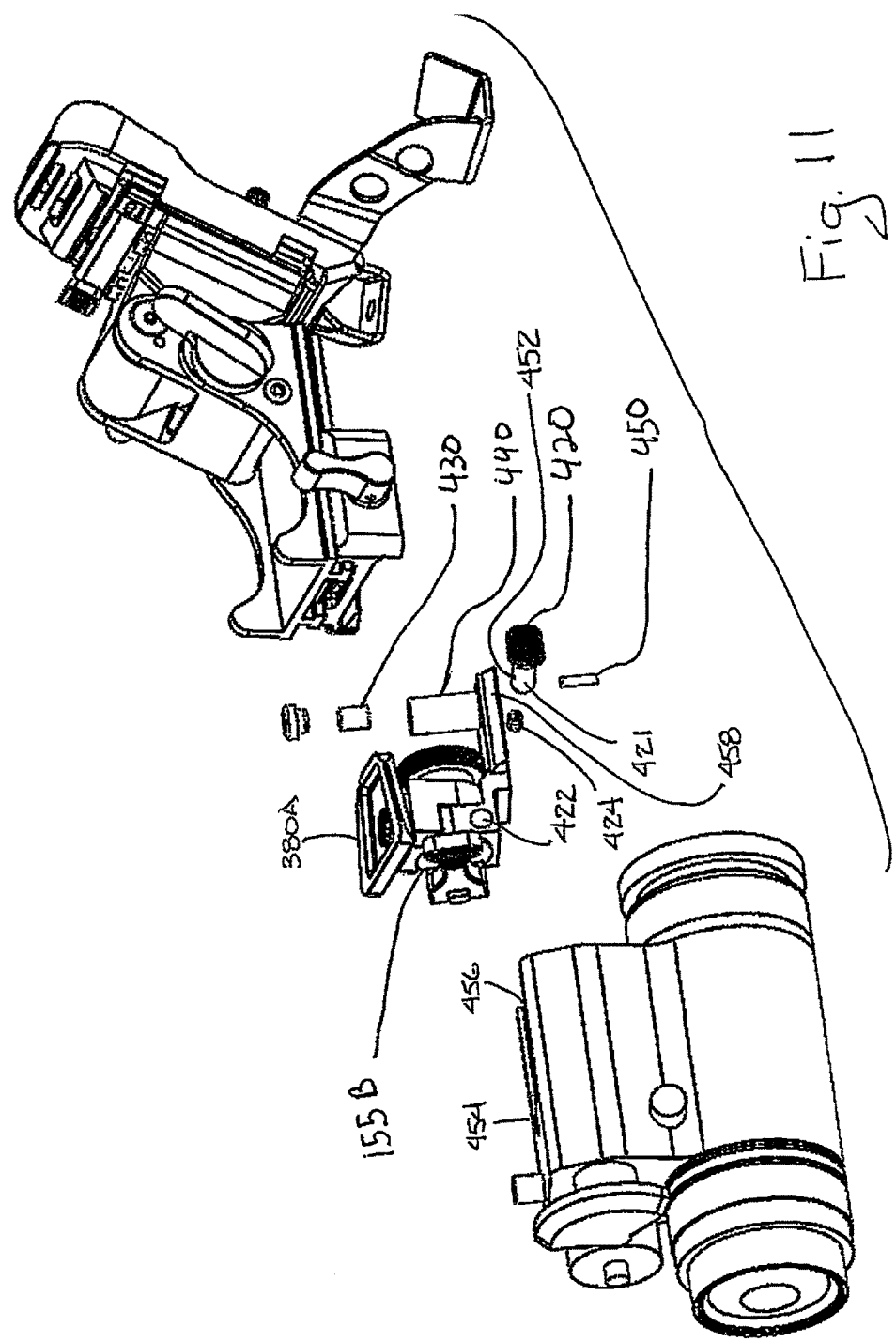
FIG. 11 is an exploded view of yet another embodiment of the attachment component.

FIG. 11 shows an exploded view of yet another attachment component 155B. This attachment component has a closed head with a circular opening that will capture the shaft. While it can rotate about the shaft, it cannot be released from the shaft laterally upon releasing the cam lock. Instead, as shown, it has a spring-loaded release button 420 that can be used to quickly release the adapter from the nvg. As a non-limiting example, the spring-loaded release button may have a shaft 421 that is adapted to be inserted into an opening 422 that extends into the side of the adapter. The opening does not extend through the adapter body so that the opening has a bottom wall. A coil spring 424 is received in the opening below the release button to bias the button toward an outwardly extending position. A lock pin 450 is fit into a hole 452 extending across the shaft 421 with an interference fit. The lock pin is positioned so that it extends beneath the shaft 421. The protruding portion of the lock pin extends down through a slot in the bottom wall of the adapter that communicates with the opening 422. The interaction of the lock pin and slot limits the travel of the push button and retains it in the adapter. The bottom end of the lock pin also engages an "L" shaped slot 454 at the front end of a receiving area 456 at the top of the nvg. The receiving area is configured to receive a dovetailed plate 458 positioned at the bottom of the adapter. When the spring-loaded release button is depressed, the adapter may be released from the nvg because the pin is moved out of the bottom of the "L" shaped slot.

A magnet 430 is also shown that can be received into a magnet module 440 on this embodiment of the adapter. Much as described above, this magnet can be used to automatically switch the nvg on when the nvg is attached to the adapter. Conversely, when the nvg is separated from the adapter, the nvg will automatically turn off.

The yoke in FIG. 11 is fitted with a dovetail plate attachment mechanism 380A to attach the adapter to a helmet mount. The helmet mount able to receive the dovetail plate is also depicted in FIG. 11.

Figure 12:
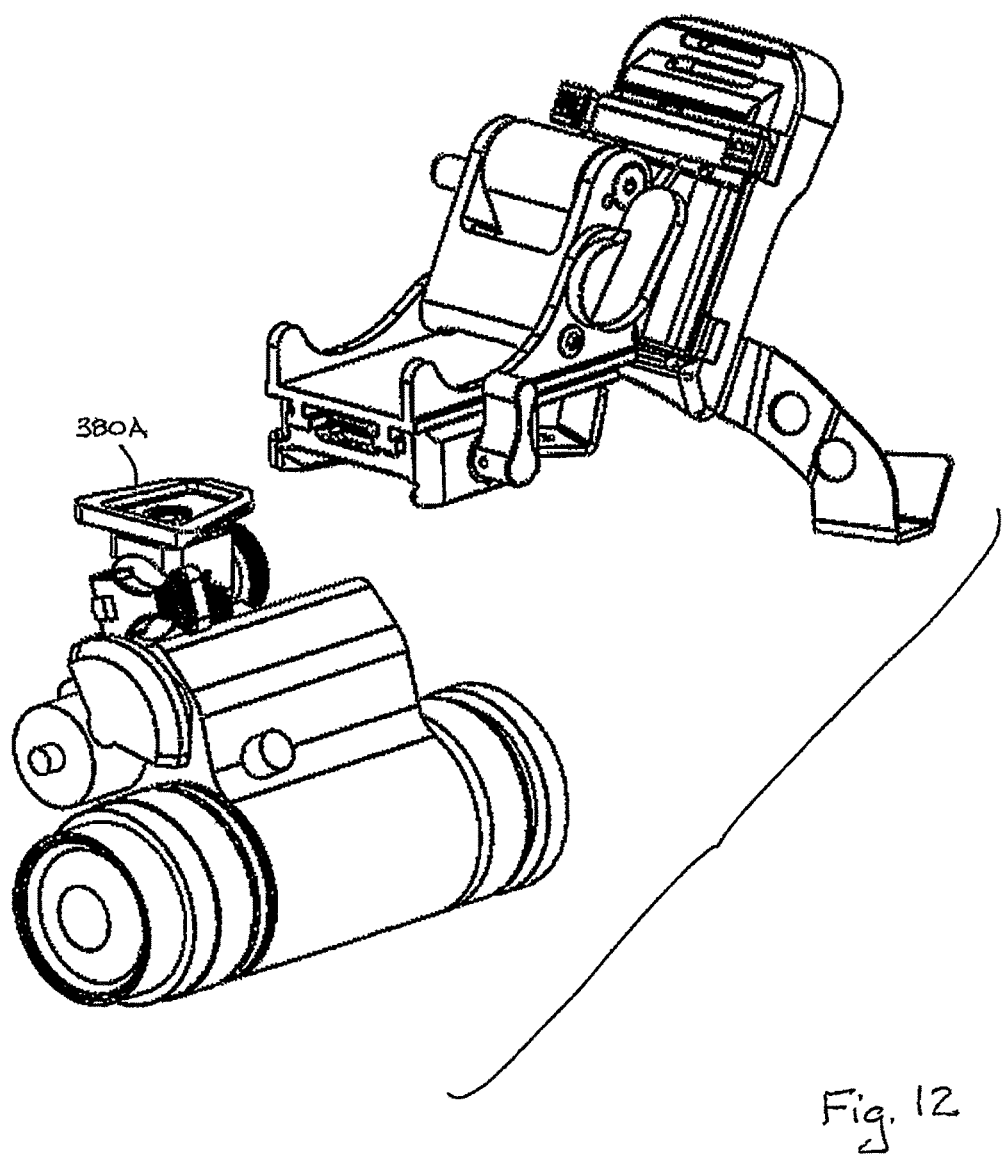
FIG. 12 is a perspective view of an adapter with a different embodiment of the attachment portion.

FIG. 12 illustrates the fully assembled adapter of FIG. 11, with the appropriate helmet mount positioned to receive the dovetail plate on the adapter.

Figure 13:
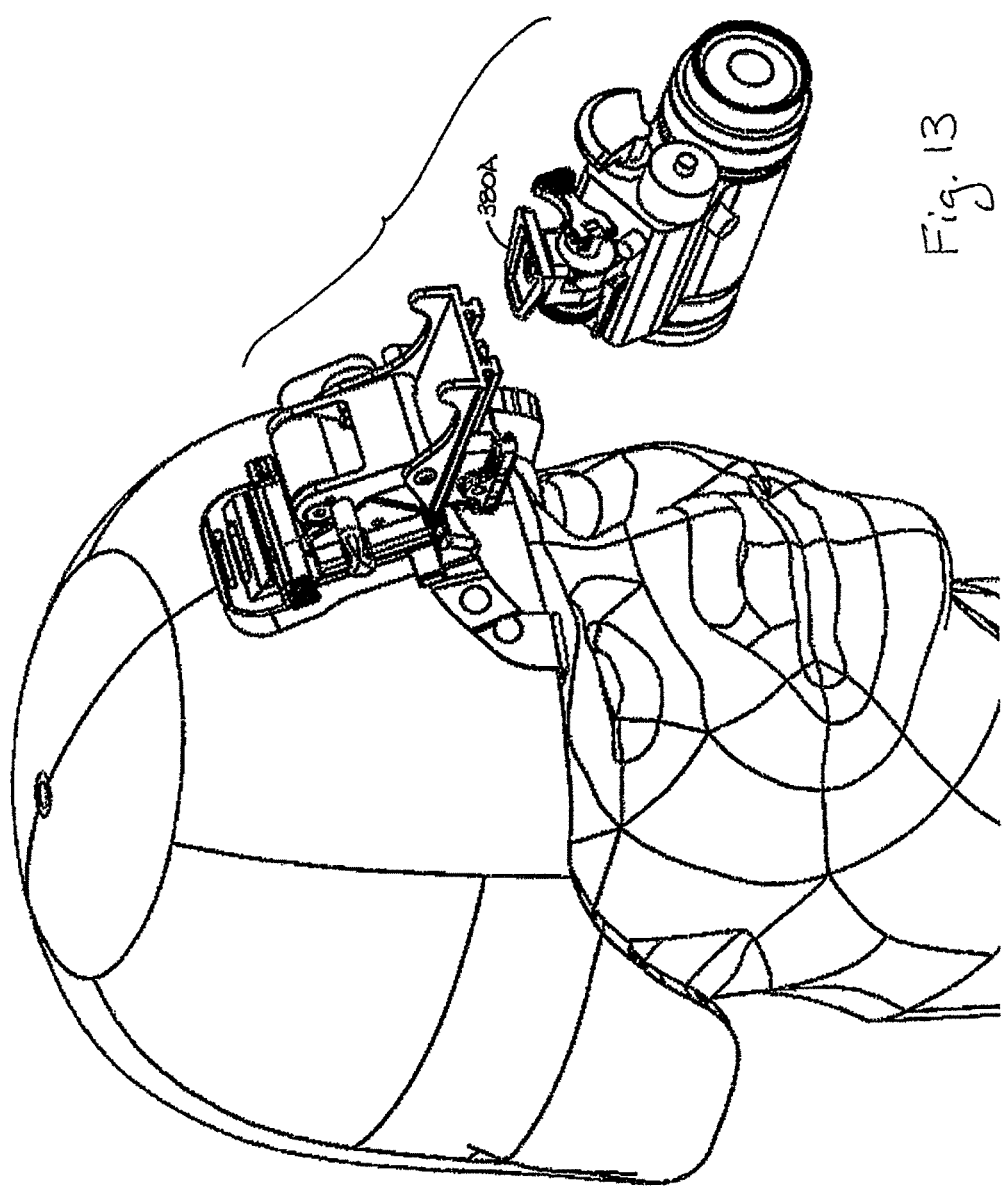
FIG. 13 is a perspective view of an adapter about to be attached to the helmet mount.

FIG. 13 depicts the fully assembled adapter of FIG. 11 in place on an nvg and in position to be received into a helmet mount that is in place on a helmet.

Figure 14:
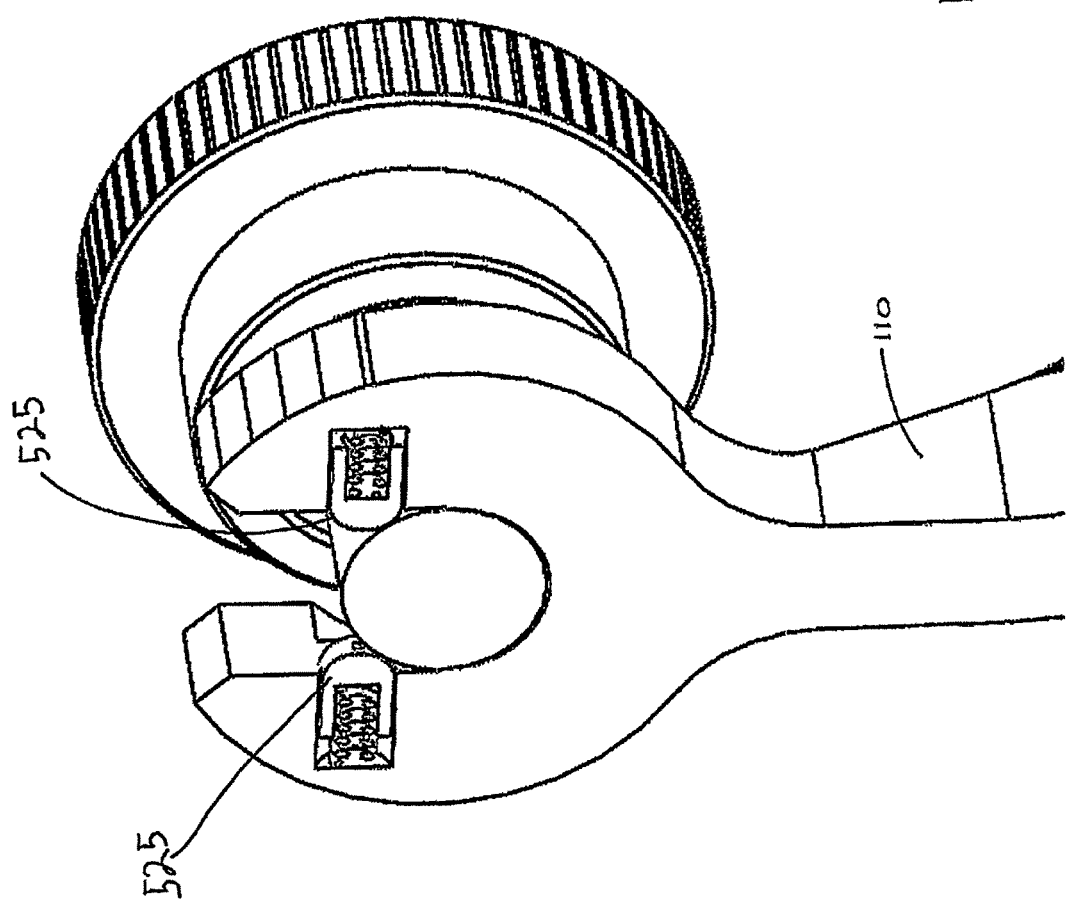
FIG. 14 is a cut away perspective view of a crescent shaped head of an arm.

FIG. 14 shows a cut away perspective view of the crescent shaped head of arm 110. Spring-loaded detents 525 may be located at either side of the mouth of the crescent shaped head. These detents allow the head to be placed over the shaft and be held in place while the cam lock is activated to hold the head in place for use. Although the detents will hold the head in place, the spring loaded detents may be overcome by a user pulling on the nvg to release the head once the cam lock is disengaged. The detents allow for one-handed attachment of the head on the shaft followed by one-handed engagement of the cam lock. The springs may provide for the biasing and the spring-loaded detents may act as a barrier to prevent the shaft from slipping off.

Although the detents are shown with attachment arm 110, it should be understood that they can be used with any embodiment using an open mouth to attach to an adapter shaft.

Figure 15:
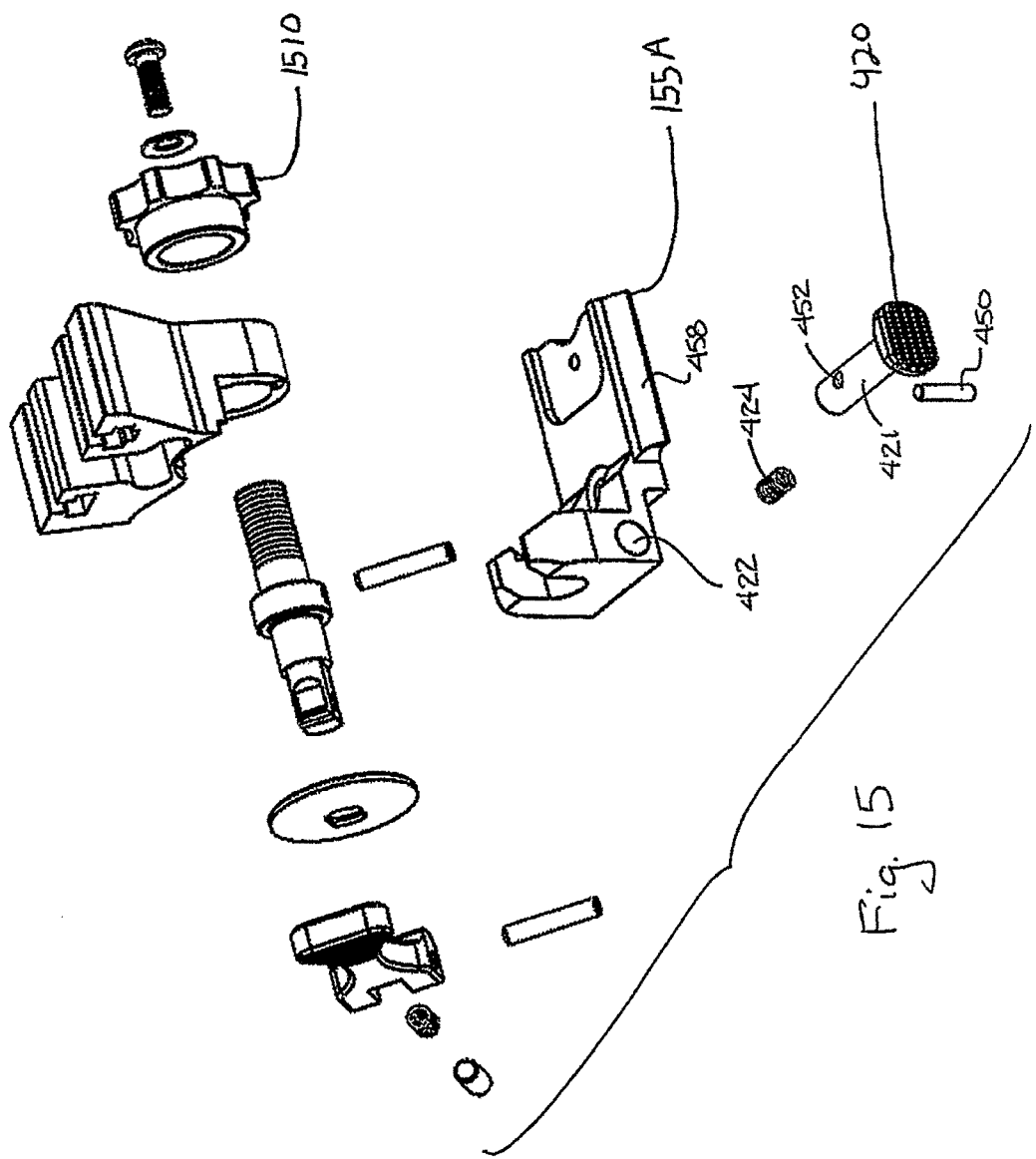
FIG. 15 is an exploded view of another embodiment of an adapter.

FIG. 15 depicts another embodiment with an exploded view of the adapter with an enlarged knob 1510 at the end. As a non-limiting example, the enlarged knob would allow for the user to finely tune the position of the nvg without the use of additional tools. As a non-limiting example, the embodiment shown in FIG. 15 depicts the alternative crescent head attachment component 155A is shown wherein the crescent head 155A is releasably attached to the nvg. In this embodiment, the crescent head may be slid on to the nvg and locked into place by the use of a spring-loaded release button.

Figure 16A:
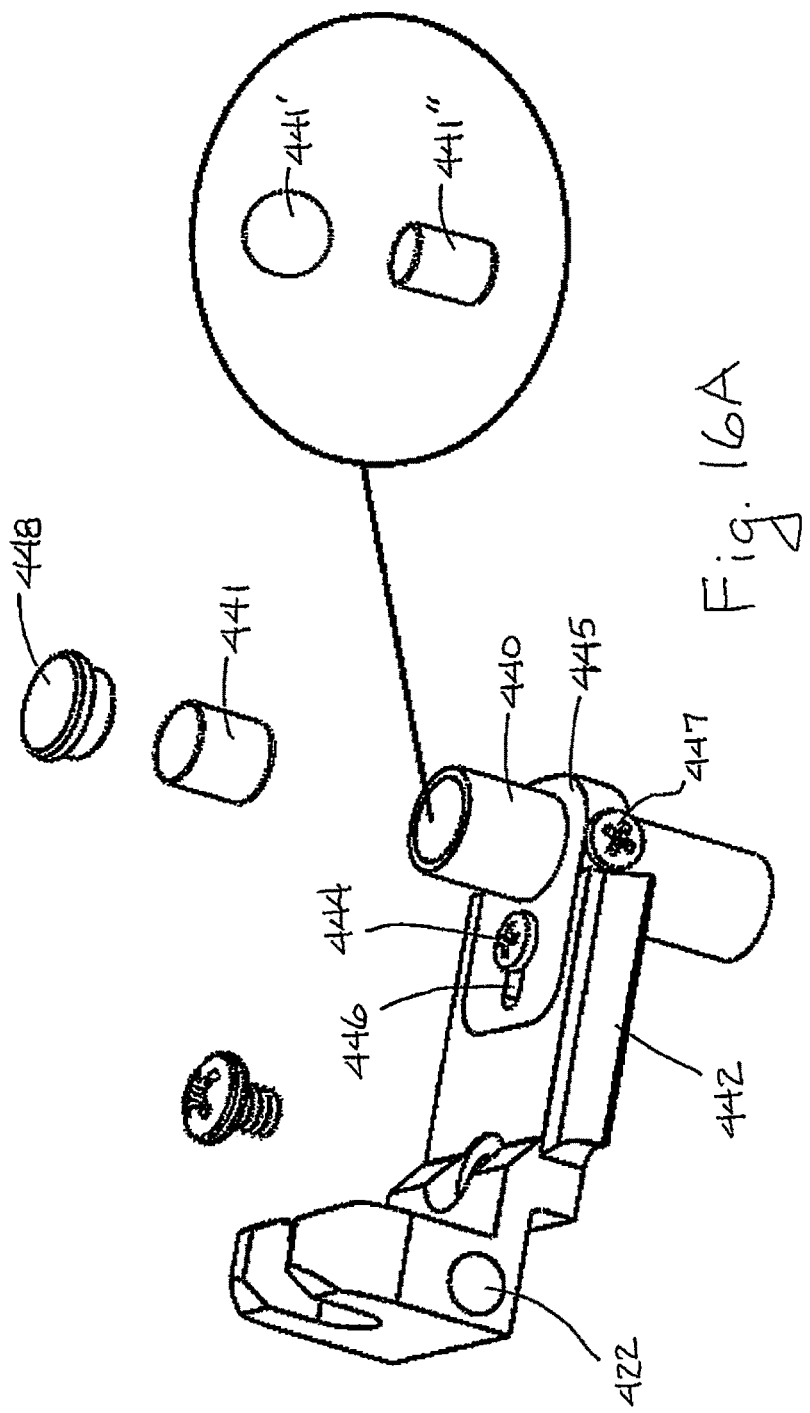
FIG. 16A is an exploded view of another embodiment of a head.

FIG. 16A shows an exploded view of a magnet module 440 wherein a magnet 441 is used to automatically switch the nvg on when the nvg is attached to the adapter. As similarly described previously, this magnet may be used to automatically switch the nvg on when the nvg is attached to the adapter. Conversely, when the nvg is separated from the adapter, the nvg will automatically turn off. In this embodiment, the magnet module is attached to a dovetailed attachment plate 442 by a screw 444 that is threaded through a slot 446 in a carrier 445 for the magnet module. Use of the screw and the slot allows for adjusting the distance of the magnet module from the head to ensure it works optimally. The magnet module is a hollow cylindrical container that is received through a circular opening in the carrier. A screw 447 is threaded through an opening in the carrier orthogonal to the magnet module to hold the magnet module in place in the carrier. Screw 447 may be loosened to allow for vertical adjustment of the position of the magnet module.

The interior of the magnet module may be sized to allow it to accommodate alternative sizes and types of magnets as may be desired. For example, alternative magnets 441' or 441" as shown in FIG. 16A may be used. A cap 448 may be used to close the magnet module to retain the magnet therein. The cap may be held on by a friction fit or may be of the screw on type.

FIG. 16B shows an exploded view of the spring-loaded release button like that of FIG. 11 that can also be used to quickly release the nvg in this embodiment. A screw 449 may also be used to attach the dovetailed attachment plate to the nvg through a hole in the plate. Screw 449 may be used in place of the plate in some embodiments, or may be used in addition to the dovetailed plate should a more stable attachment be desired. The crescent head of FIG. 16B is a depiction of that of FIG. 16A with the magnet module assembled.

FIG. 17 shows another embodiment of the head. The head may be attached to a clamp ring 1710 and may be clamped to the nvg. The clamp ring may be tightened by any suitable means. As a non-limiting example, the clamp ring may be tightened by the use of a screw 1720. The clamp ring is split at the bottom opposite the head. A gap at the split allows for adjustment of the diameter of the opening of the clamp. Matching bosses 1722 extend down from the clamp ring at either side of the gap. Mated threaded openings 1724 extend through the bosses and are adapted to threadably receive screw 1720. The openings are threaded so that turning the screw one direction closes the gap while turning it in the other direction opens the gap. Thus, a user can turn the screw to tighten or loosen the clamp. The clamp ring may have a hole 1712 between the head and the ring so that it doesn't interfere with the lever of a goggle horn. Moreover, the hole may reduce the weight of the overall clamp ring.

In another embodiment, the clamp ring may have a textured surface and/or frictional material on the inside surface in order to increase friction and thereby assist in connecting with the nvg.

FIG. 18 illustrates the fully assembled adapter of FIG. 17, with the appropriate head clamped to the nvg.

Embodiments of the present invention provide for a secure attachment of the night vision goggles (nvg) to the helmet through the use of a night vision goggle adapter. In addition, embodiments of the present invention allow for the position and orientation of the nvg to be customized for a particular user.

Furthermore, embodiments of the present invention allow for secure attachment of the nvg adapter by using a cam system to lock the nvg in a general position, however, through the use of a knob, the user can finely adjust the amount of friction that must be overcome to change the position of the nvg, whether through user intent or inadvertent impact.

FIGS. 19A through 25B show an embodiment of the adapter in use to position an nvg relative to a helmet on a user. They show the wide variety of different positions that may be achieved using the adapter in conjunction with a helmet mount that may be flipped down or flipped up. Although these figures depict one embodiment of the adapter, it should be understood that any of the adapter embodiments described herein, and any variations thereof, may be used to achieve the same positions.

Figure 19B:
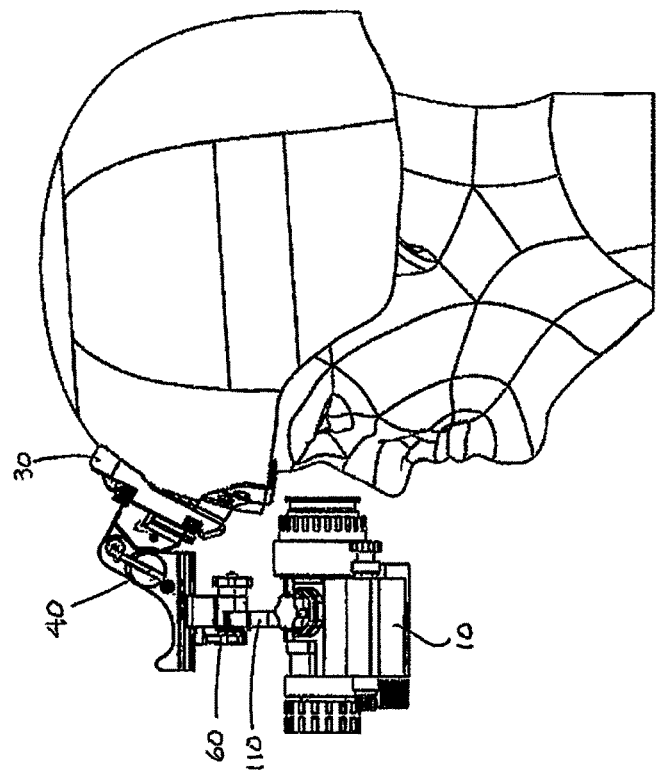
FIG. 19B is a side view of the embodiment in use as shown in FIG. 19A.
Figure 19A:
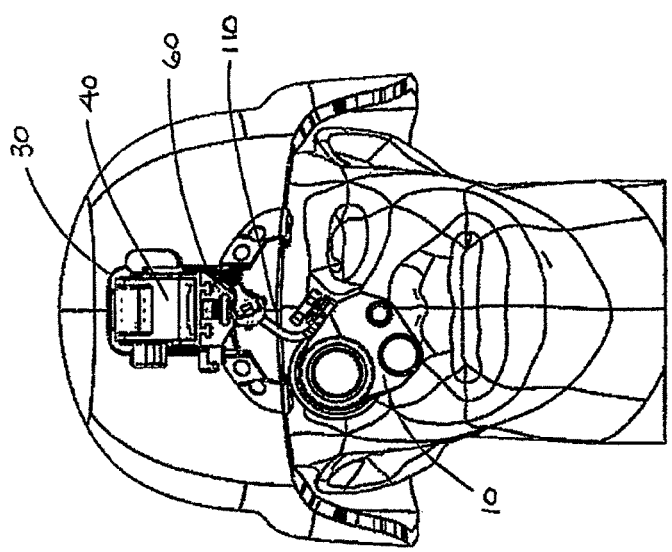
FIG. 19A is a front view of an adapter according to one embodiment in use positioning a night vision goggle in front of a user's right eye.

FIGS. 19A and 19B show a helmet mount attached to a helmet and in the flipped down position. An nvg is attached to the helmet mount through an adapter. The adapter has an arm attached to its shaft that has been rotated and then locked down to position the nvg in front of the right eye of the user. As noted above, the arm may be positioned at an infinite number of spots along the path of rotation to facilitate a user being able to select a favorable position for the nvg. FIG. 19A is a front view and FIG. 19B is a side view of this position, which is that typically adopted when the nvg is in use.

Figure 20B:
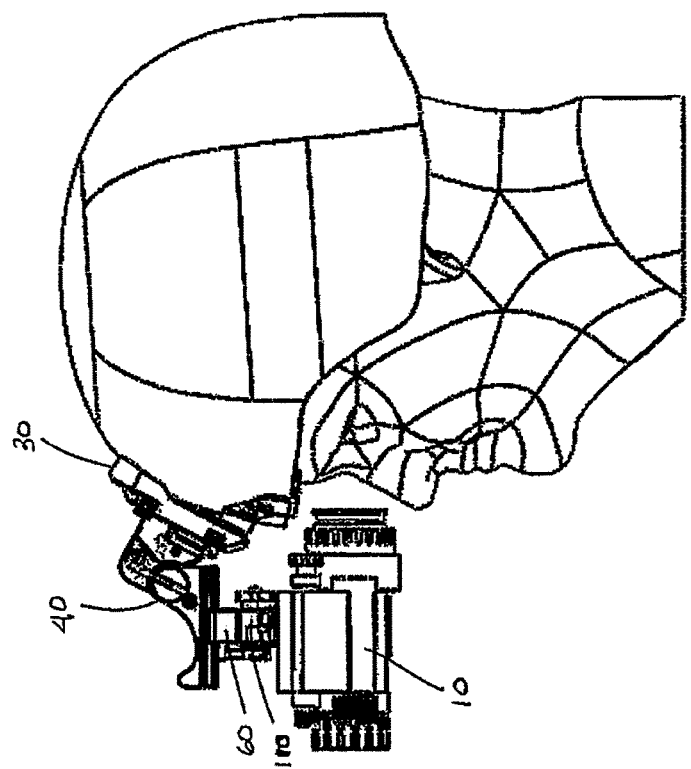
FIG. 20B is a side view of the embodiment in use as shown in FIG. 20A.
Figure 20A:
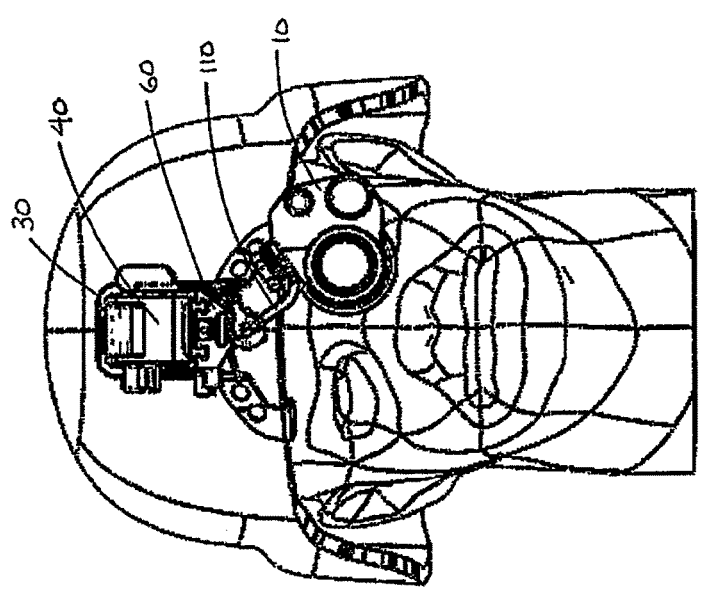
FIG. 20A is a front view of an adapter according to one embodiment in use positioning a night vision goggle in front of a user's left eye.

FIGS. 20A and 20B also reflect the position typically adopted when the nvg is in use like FIGS. 19A and 19B. However, FIGS. 20A and 20B show the arm rotated so that the nvg is in front of the left eye of the user. Some users may prefer the nvg in front of their left eye rather than their right eye. The adapter allows for such positioning.

Figure 21B:
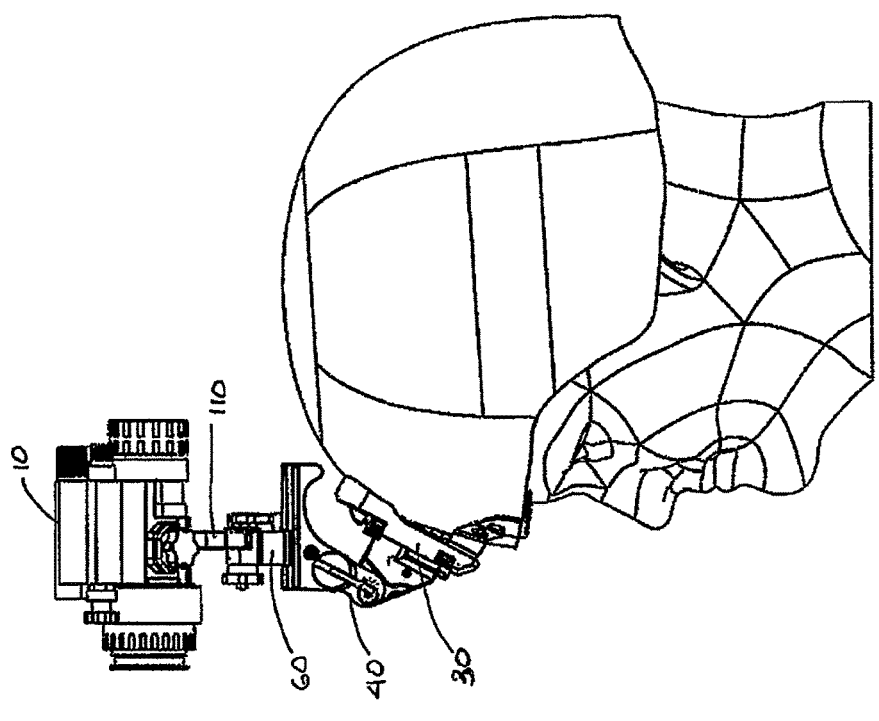
FIG. 21B is a side view of the embodiment in use as shown in FIG. 21A.
Figure 21A:
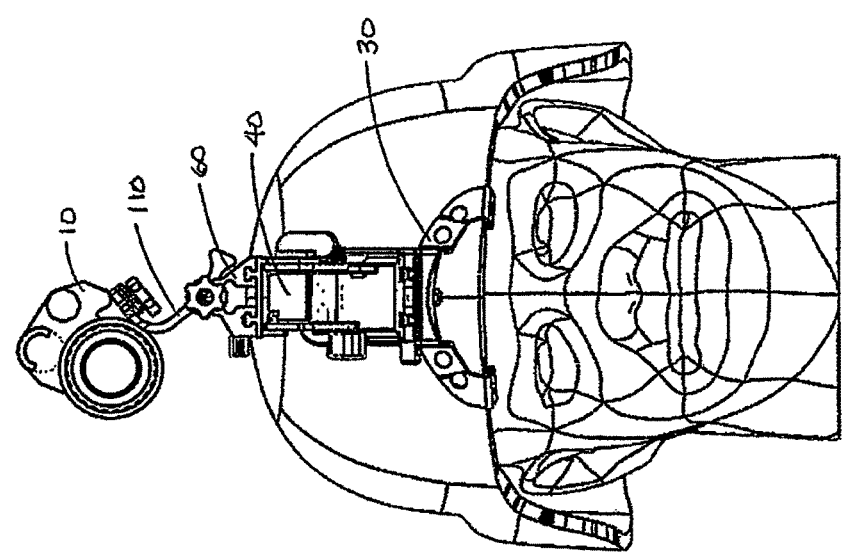
FIG. 21A is a front view of an adaptor according to one embodiment in use positioning a night vision goggle in a typical stow position.

FIGS. 21A and 21B depict front and side views, respectively, of a helmet mount in the flipped up position. This would be the standard position for placing an nvg in a stowed position when it was not in use. In these figures, the nvg was positioned in front of the user's right eye for use of the nvg and the helmet mount has been flipped up without any adjustment of the arm relative to the adapter shaft. As shown, stowing the nvg in this manner results in a high profile for the nvg positioned above the helmet of the user. This may be an inconvenient and uncomfortable stowage position in certain circumstances.

Figure 22A:
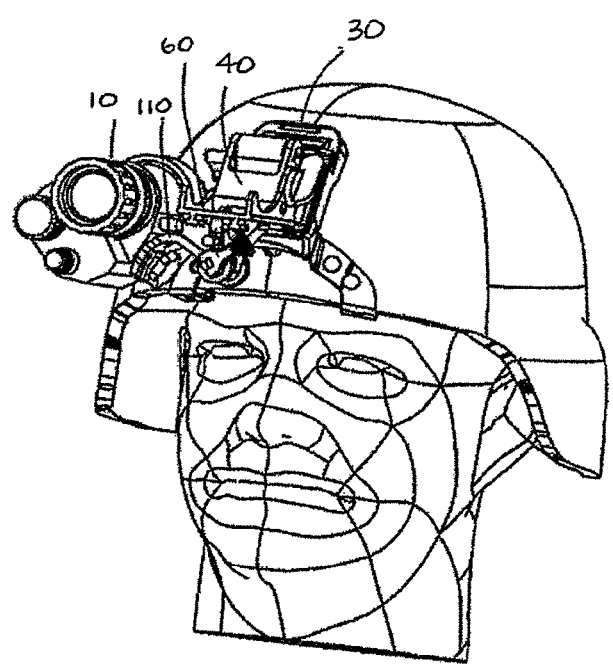
FIG. 22A is a perspective view of an adapter according to one embodiment in use positioning a night vision goggle in a low stow position to the right of a user.
Figure 22C:
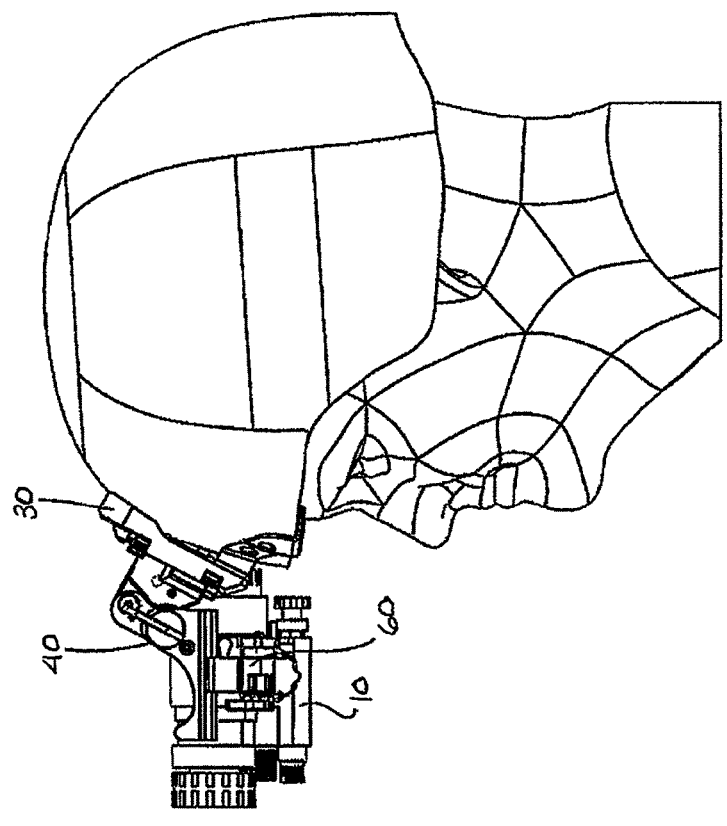
FIG. 22C is a side view of the embodiment in use as shown in FIG. 22A.
Figure 22B:
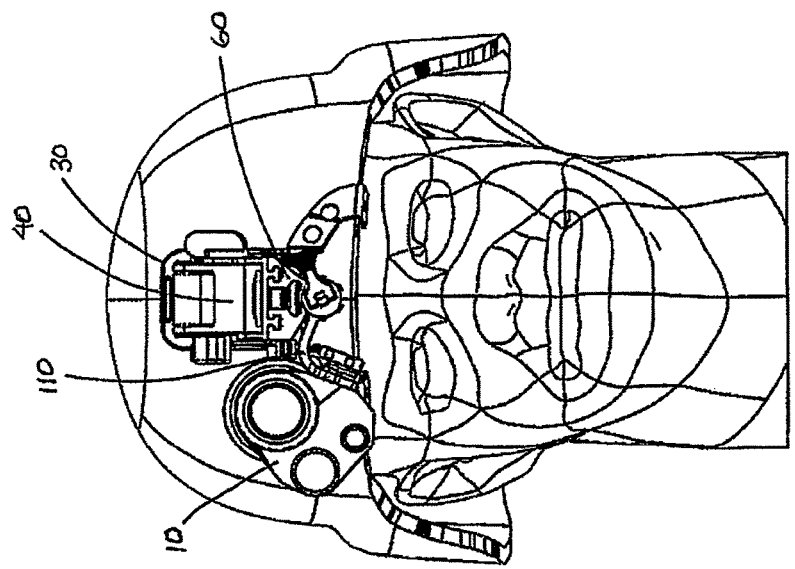
FIG. 22B is a front view of the embodiment in use as shown in FIG. 22A.

FIGS. 22A, 22B, and 22C depict perspective, front, and side views, respectively, of an nvg in a low stow position. In this position, the helmet mount has been kept in the flipped down position. As noted above, the adapter may be adjusted so that it normally stays in place but with manual force exerted by a user, the arm may be rotated relative to the shaft. In these figures, the nvg was positioned for use in front of the user's right eye. However, by grabbing the nvg with one hand, the user may rotate the arm about the shaft to move the nvg about an arc further to the right. This movement places the nvg above the brim of the user's helmet providing a clear field of view for the user if the user wants to see without the nvg. This stow position may be used if a user anticipates needing to move quickly between using and not using the nvg.

Figure 23A:
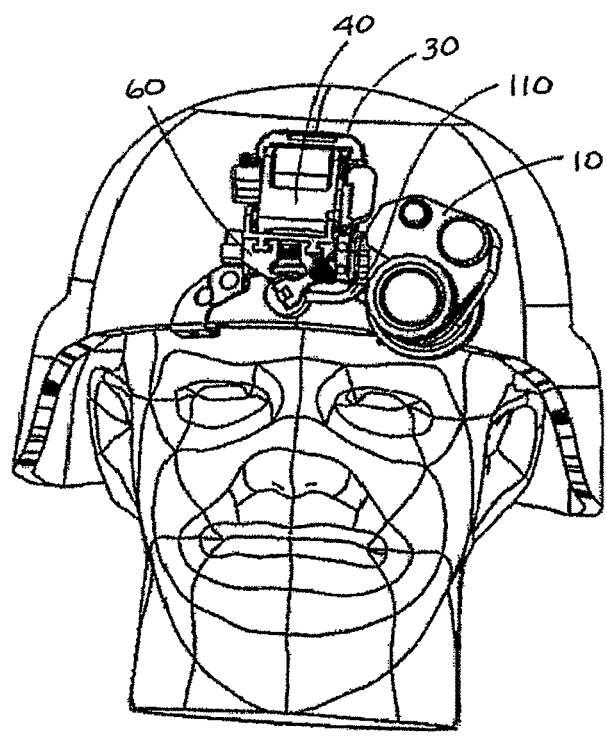
FIG. 23A is a perspective view of an adapter according to one embodiment in use positioning a night vision goggle in a low stow position to the left of a user.
Figure 23C:
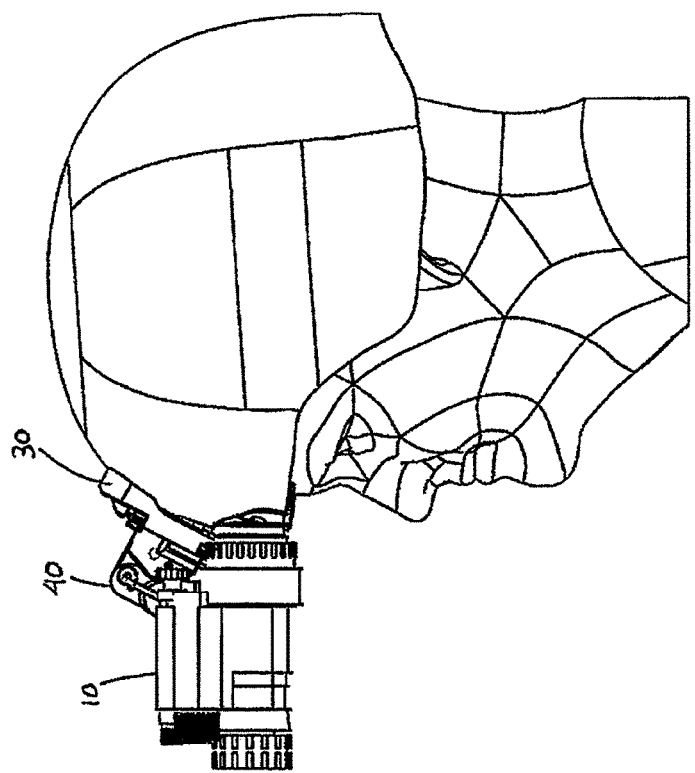
FIG. 23C is a side view of the embodiment in use as shown in FIG. 23A.
Figure 23B:
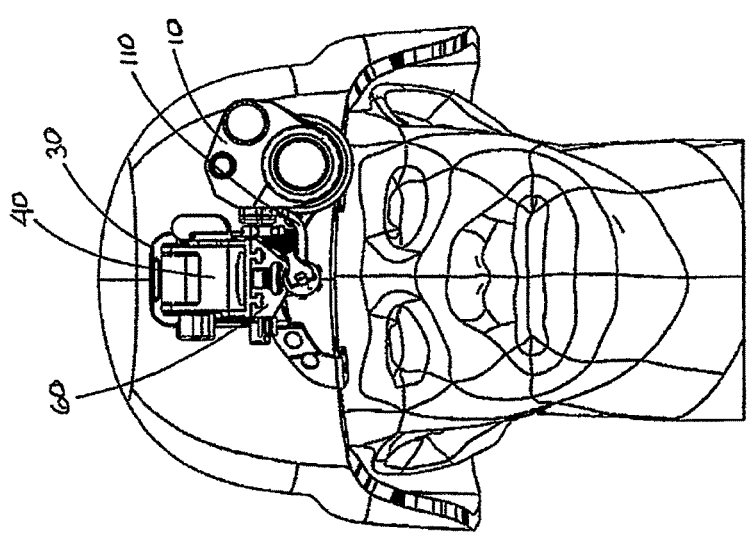
FIG. 23B is a front view of the embodiment in use as shown in FIG. 23A.

FIGS. 23A, 23B, and 23C depict perspective, front, and side views, respectively, of an nvg in a low stow position similar to that of FIGS. 22A, 22B, and 22C. However, in FIGS. 23A, 23B, and 23C, the nvg has been rotated about the arm further to the left from being positioned for use in front of a user's left eye. Thus, a low stow position may be quickly achieved to the left as well as to the right of a user.

Figure 24B:
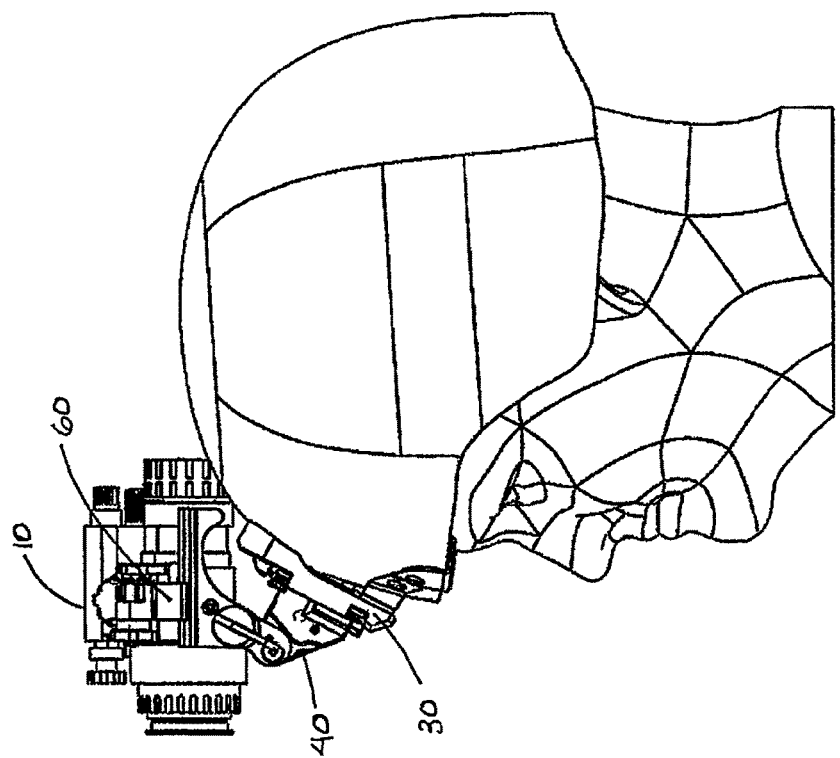
FIG. 24B is a side view of the embodiment in use as shown in FIG. 24A.
Figure 24A:
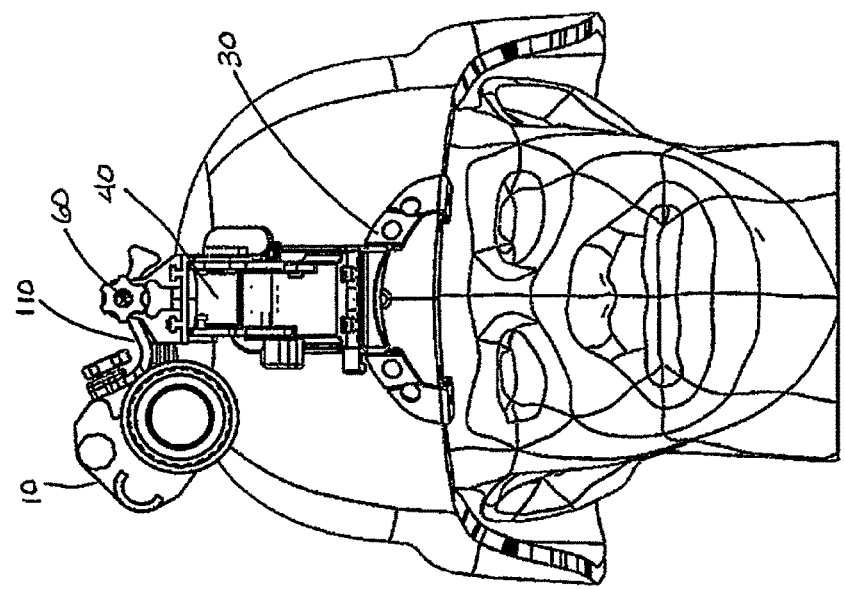
FIG. 24A is a front view of an adapter according to one embodiment in use positioning a night vision goggle in an alternative high stow position to the right of a user.

FIGS. 24A and 24B depict front and side views, respectively, of an nvg in an alternate high stow position. In these figures, the helmet mount has been moved to the flipped up position. However, by grabbing the nvg, the user has rotated the nvg to the right of the user about the adapter shaft to move the nvg closer to the helmet. Thus, a lower profile is achieved when the helmet mount is flipped up.

Figure 25B:
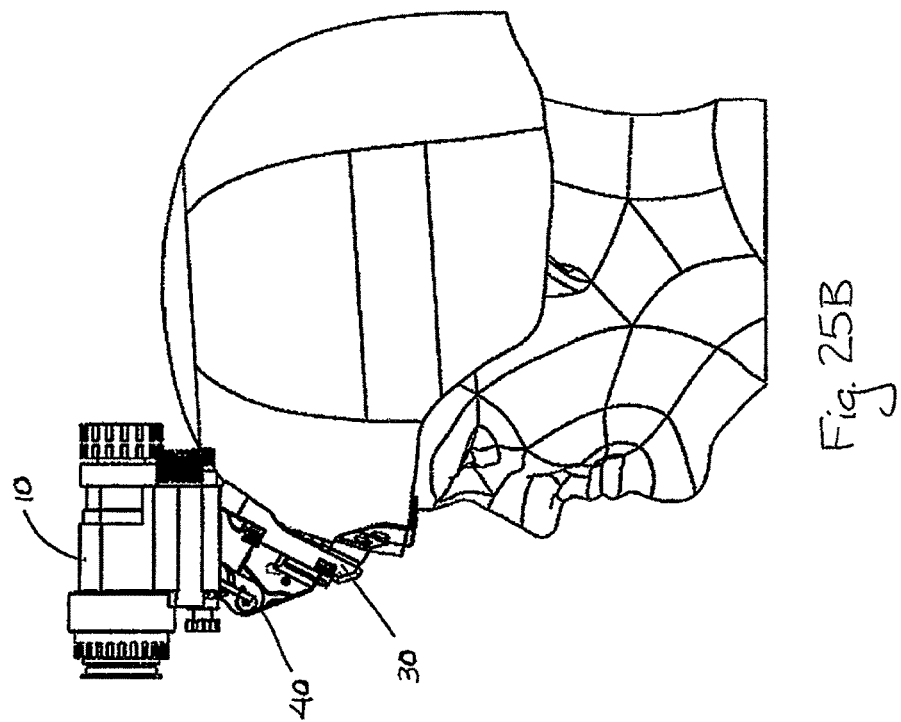
FIG. 25B is a side view of the embodiment in use as shown in FIG. 25A.
Figure 25A:
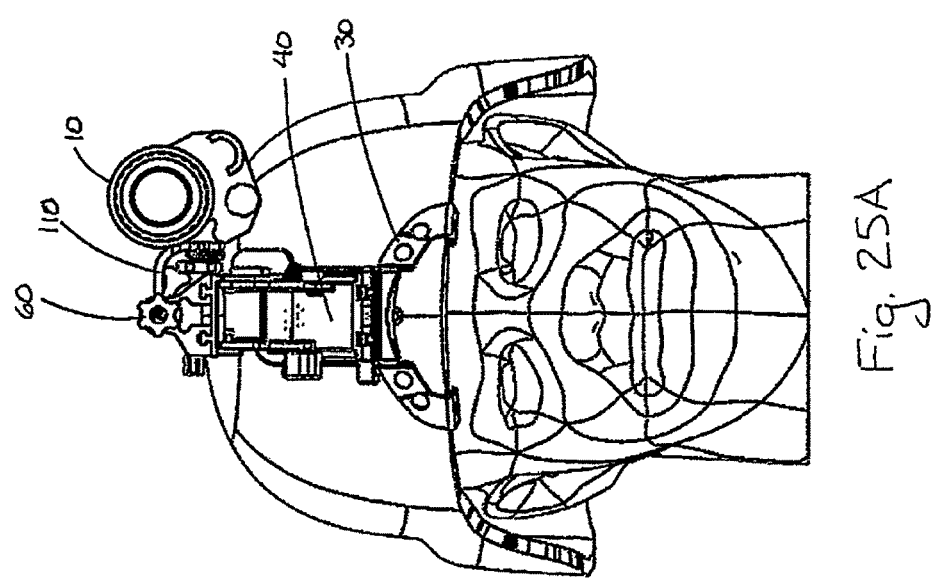
FIG. 25A is a front view of an adapter according to one embodiment in use positioning a night vision goggle in an alternative high stow position to the left of a user.

FIGS. 25A and 25B depict front and side views, respectively, of an nvg in another alternate high stow position. In this alternate, the user has rotated the nvg to the left of the user about the adapter shaft to move the nvg closer to the helmet. Depending upon user preference, a lower profile high stow may be achieved to the left or the right.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present invention. As used herein, the singular forms "a," "an," and "the" are intended to include the plural forms as well, unless the context dearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claim and its equivalents.

What is claimed is:

1. A night vision goggle adapter, the adapter comprising:
    a first knob;
    a yoke, wherein the yoke comprises an attachment portion operably connected to a helmet mount;
    a spring operably placed between the first knob and yoke;
    a shaft, wherein the shaft comprises:
    a first end operably connected with the knob, and
    a second end;
    a head, wherein the head receives a portion of the shaft and is attached to a night vision goggle, and wherein the head comprises an attachment arm, and wherein the attachment arm attaches to the night vision goggle and the attachment arm comprises a second knob that attaches the night vision goggle to the attachment arm; and
    a cam pivotally mounted to the second end of the shaft for movement between a release and clamped position to respectively disengage and engage the adapter to the head.

2. The adapter of claim 1, wherein a surface of the first knob is knurled or castellated.

3. The adapter of claim 1, wherein the attachment portion is a rail.

4. The adapter of claim 1, wherein the attachment portion is a dovetail plate.

5. The adapter of claim 1, wherein the attachment arm comprises a magnetic gravity switch.

6. The adapter of claim 1, wherein the head comprises a counter bore portion.

7. The adapter of claim 1, wherein the shaft comprises a wider diameter portion.

8. The adapter of claim 7, wherein a cross pin is fixed into the wider diameter portion of the shaft, the ends of the pin extend outwardly beyond the diameter of the wider diameter portion of the shaft, wherein the ends of the pin are received into notches about an opening at a bottom of the yoke.

9. A method of attaching from an adapter for a night vision goggle, the adapter comprising:
    a first knob;
    a yoke, wherein the yoke comprises an attachment portion operably connected to a helmet mount;

a spring operably placed between the first knob and yoke;
a shaft, wherein the shaft comprises:
   a first end operably connected with the first knob, and a second end;
a head, wherein the head receives a portion of the shaft and is attached to a night vision goggle, and wherein the head comprises an attachment arm, and wherein the attachment arm attaches to the night vision goggle and the attachment arm comprises a second knob that attaches to the night vision goggle to the attachment arm; and
a cam pivotally mounted to the second end of the shaft for movement between a release and clamped position, comprising the step of:
   disengaging; and
   engaging the adapter to the night vision goggle.

10. The method of claim 9, wherein a surface of the first knob is knurled or castellated.

11. The method of claim 9, wherein the attachment portion is a rail.

12. The method of claim 9, wherein the attachment portion is a dovetail plate.

13. The method of claim 9, wherein the attachment arm comprises a magnetic gravity switch.

14. The method of claim 9, wherein the head comprises a counter bore portion.

15. The method of claim 9, wherein the shaft comprises a wider diameter portion.

16. The method of claim 15, wherein a cross pin is fixed into the wider diameter portion of the shaft, the ends of the pin extend outwardly beyond the diameter of the wider diameter portion of the shaft, wherein the ends of the pin are received into notches about an opening at a bottom of the yoke.

* * * * *